(12) United States Patent
Yamakawa et al.

(10) Patent No.: US 11,397,190 B2
(45) Date of Patent: Jul. 26, 2022

(54) TEST SYSTEM

(71) Applicant: SYSMEX CORPORATION, Kobe (JP)

(72) Inventors: Nobuyoshi Yamakawa, Kobe (JP); Hiroo Tatsutani, Kobe (JP); Yuichiro Ohmae, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 0 days.

(21) Appl. No.: 14/834,782

(22) Filed: Aug. 25, 2015

(65) Prior Publication Data

US 2016/0061851 A1    Mar. 3, 2016

(30) Foreign Application Priority Data

Aug. 29, 2014  (JP) .............................. JP2014-176478
Jul. 27, 2015  (JP) .............................. JP2015-147424

(51) Int. Cl.
*G01N 35/00*  (2006.01)
*G01N 35/02*  (2006.01)
(Continued)

(52) U.S. Cl.
CPC ....... *G01N 35/00732* (2013.01); *G01N 21/78* (2013.01); *G01N 35/00* (2013.01); *G01N 35/00871* (2013.01); *G01N 35/026* (2013.01); *G01N 35/04* (2013.01); *G01N 35/02* (2013.01); *G01N 2021/7759* (2013.01); *G01N 2035/00326* (2013.01); *G01N 2035/00831* (2013.01); *G01N 2035/00851* (2013.01); *G01N 2035/00881* (2013.01); *G01N 2035/0465* (2013.01);
(Continued)

(58) Field of Classification Search
CPC .............. G01N 35/00871; G01N 2035/00326
See application file for complete search history.

(56) References Cited

U.S. PATENT DOCUMENTS

2005/0075757 A1   4/2005  Haas et al.
2006/0229763 A1  10/2006  Haas et al.
(Continued)

FOREIGN PATENT DOCUMENTS

EP    1469944 A1   10/2004
EP    2047282 A2   4/2009
(Continued)

OTHER PUBLICATIONS

Communication pursuant to Article 94(3) EPC dated Nov. 5, 2019 in a counterpart European patent application.
(Continued)

*Primary Examiner* — Kathryn Wright
(74) *Attorney, Agent, or Firm* — Metrolex IP Law Group, PLLC

(57) ABSTRACT

Provided is a test system operable with a simplified structure. A test system includes a first test device and a second test device each of which transports and tests a sample. The test device includes a master control unit, which performs assignment of samples to the first test device and the second test device, and control of a transport operation of the sample assigned to the test device. The test device includes a slave control unit, which controls a transport operation of the sample assigned to the test device by the master control unit.

13 Claims, 18 Drawing Sheets

(51) Int. Cl.
*G01N 35/04* (2006.01)
*G01N 21/78* (2006.01)
*G01N 21/77* (2006.01)

(52) U.S. Cl.
CPC ........... *G01N 2035/0491* (2013.01); *G01N 2201/025* (2013.01); *G01N 2201/061* (2013.01)

(56) References Cited

U.S. PATENT DOCUMENTS

| | | | |
|---|---|---|---|
| 2009/0223308 A1* | 9/2009 | Fukuma | G01N 35/026 73/863.01 |
| 2010/0083772 A1 | 4/2010 | Tanaka | |
| 2010/0300217 A1 | 12/2010 | Mizumoto | |
| 2012/0148447 A1 | 6/2012 | Tanaka | |

FOREIGN PATENT DOCUMENTS

| | | |
|---|---|---|
| EP | 2172781 A2 | 4/2010 |
| EP | 2256476 A2 | 12/2010 |
| EP | 2339354 A2 | 6/2011 |
| EP | 2339355 A2 | 6/2011 |
| JP | 2010-091313 A | 4/2010 |
| WO | 03/061830 A1 | 7/2003 |
| WO | 2008/012104 A2 | 1/2008 |
| WO | 2013/149117 A2 | 10/2013 |

OTHER PUBLICATIONS

Summons to attend oral proceedings pursuant to Rule 115(1) EPC issued on Oct. 29, 2020 in the counterpart European patent application.

* cited by examiner

PROCESSING FLOW OF ASSIGNMENT BY MASTER CONTROL UNIT <SYSTEM MEASUREMENT>

PROCESSING FLOW OF MODE CHANGE BY MASTER CONTROL UNIT AND SLAVE CONTROL UNIT

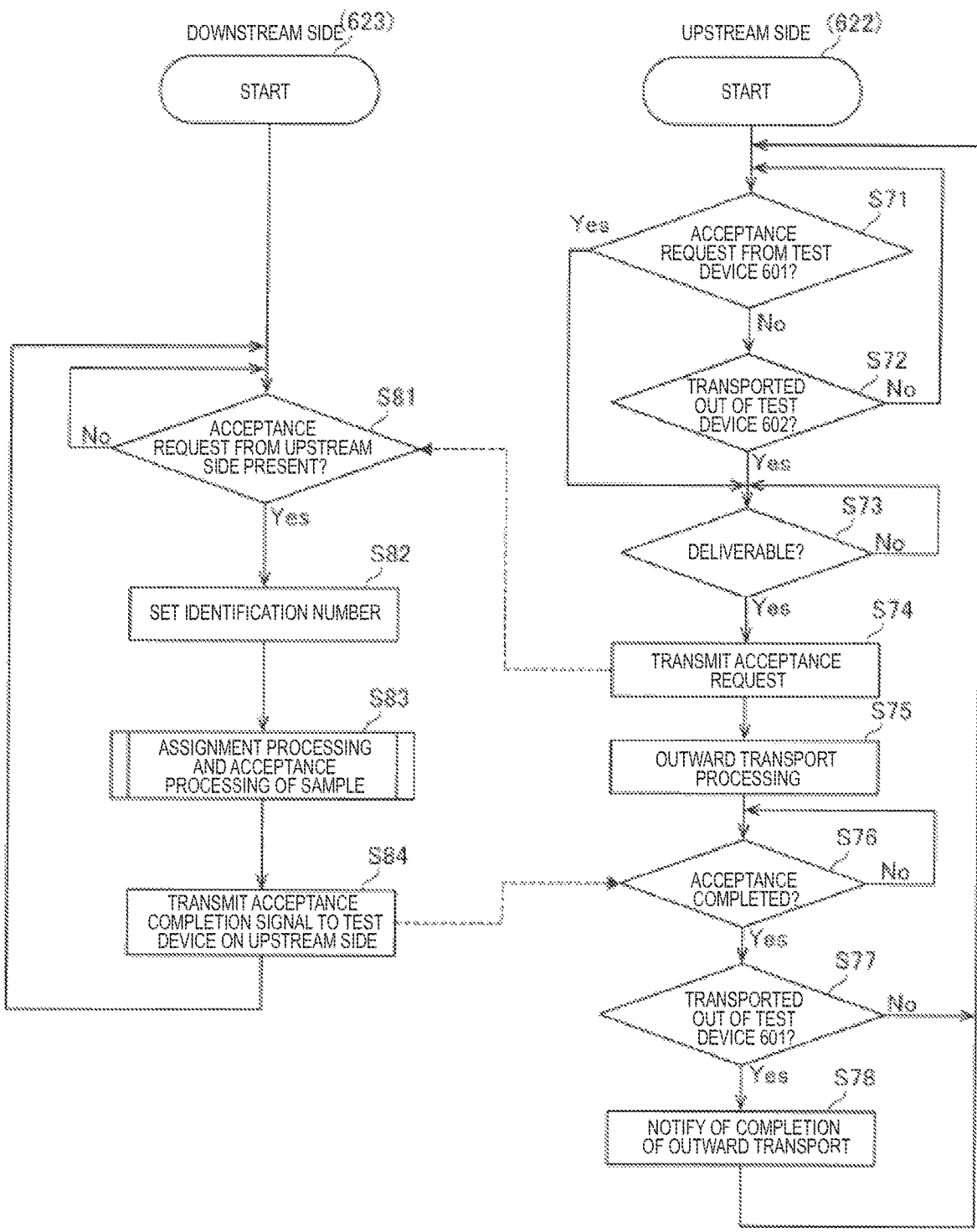

TEST SYSTEM

CROSS REFERENCE TO RELATED APPLICATIONS

This application claims priority based on 35 USC 119 from prior Japanese Patent Applications No. 2014-176478 filed on Aug. 29, 2014, and No. 2015-147424 filed on Jul. 27, 2015, entitled "TEST SYSTEM", the entire contents of which are hereby incorporated by reference.

BACKGROUND

This disclosure relates to a test system that transports and test urine or blood contained in a rack.

A test system provided with multiple test devices is disclosed in Japanese Patent Application Publication No. 2010-91313 (Patent Document 1.) Each of the test devices includes a transport unit. Each transport unit transports a sample into and out of the corresponding test device. The test system includes a dedicated system control device for determining assignment of samples to the test devices. The system control device is disposed outside of the test devices.

According to Patent Document 1, the dedicated system control device is required for determining the assignment of samples to the test devices. In this regard, simplification of the test system is demanded.

SUMMARY

A test system according to an embodiment includes a first test device, which transports and tests a sample, and a second test device, which transports and tests a sample. The first test device includes a master control unit, which performs assignment of samples to the first test device and the second test device, and control of an operation to transport the sample assigned to the first test device. The second test device includes a slave control unit, which controls an operation to transport the sample assigned to the second test device by the master control unit.

A test system according to an embodiment includes: a first test device, a second test device, a third test device, and a fourth test device each of which transports and tests a sample. Here, the first test device and the second test device are test devices which perform a test of a first test type, while the third device and the fourth test device are test devices, which perform a test of a second test type different from the first test type. The first test device includes a first master control unit, which performs assignment of samples to the first test device and the second test device, and control of a transport operation of the sample assigned to the first test device. The second test device includes a first slave control unit, which controls a transport operation of the sample assigned to the second test device by the first master control unit. The third test device includes a second master control unit, which performs assignment of samples to the third test device and the fourth test device, and control of a transport operation of the sample assigned to the third test device. The fourth test device includes a second slave control unit which controls a transport operation of the sample assigned to the fourth test device by the second master control unit.

A testing method according to an embodiment is a testing method using a test system provided with a first test device and a second test device each of which transports and tests a sample. The method includes: causing a master control unit of the first test device to perform assignment of samples to the first test device and the second test device, and control of a transport operation of the sample assigned to the first test device; and causing a slave control unit of the second test device to perform a transport operation of the sample assigned to the second test device by the master control unit.

A testing method according to an embodiment is a testing method using a test system including a first test device, a second test device, a third test device, and a fourth test device each of which transports and tests a sample. Here, the first test device and the second test device are test devices, which perform a test of a first test type, while the third device and the fourth test device are test devices, which perform a test of a second test type different from the first test type. The method includes: causing a first master control unit of the first test device to perform assignment of samples to the first test device and the second test device, and control of a transport operation of the sample assigned to the first test device; causing a first slave control unit of the second test device to control a transport operation of the sample assigned to the second test device by the first master control unit; causing a second master control unit of the third test device to perform assignment of samples to the third test device and the fourth test device, and control of a transport operation of the sample assigned to the third test device; and causing a second slave control unit of the fourth test device to control a transport operation of the sample assigned to the fourth test device by the second master control unit.

FIG. 20 is a flowchart for explaining sample transport processing between test devices of different test types in the test system according to the fifth embodiment.

DETAILED DESCRIPTION

First Embodiment

A configuration of test system 10 according to a first embodiment is described below with reference to FIG. 1 to FIG. 3.

Overall Configuration of Test System

Figure 1:
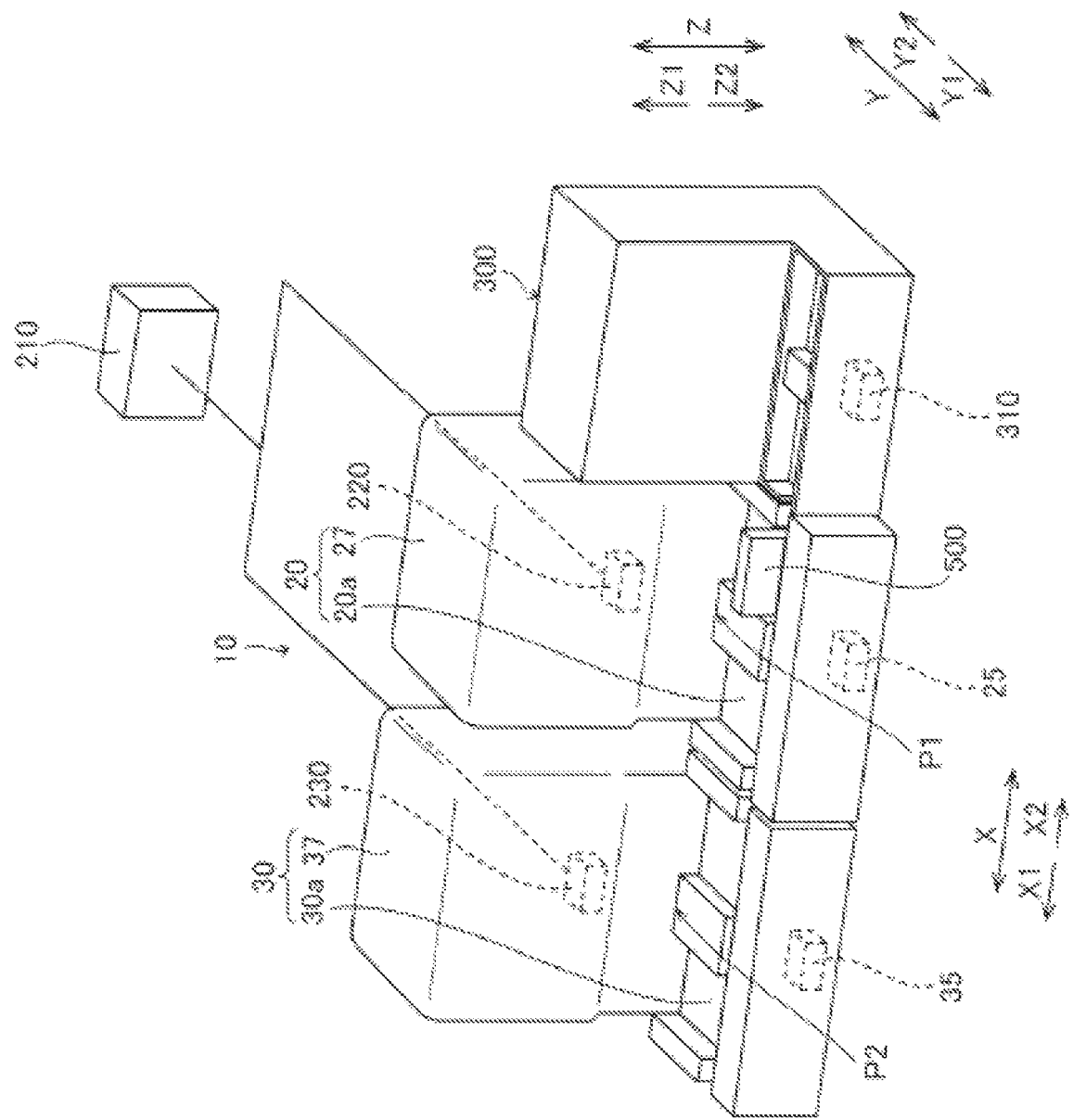
FIG. 1 is a diagram illustrating a state where a test system according to a first embodiment is connected to another device.
Figure 2:
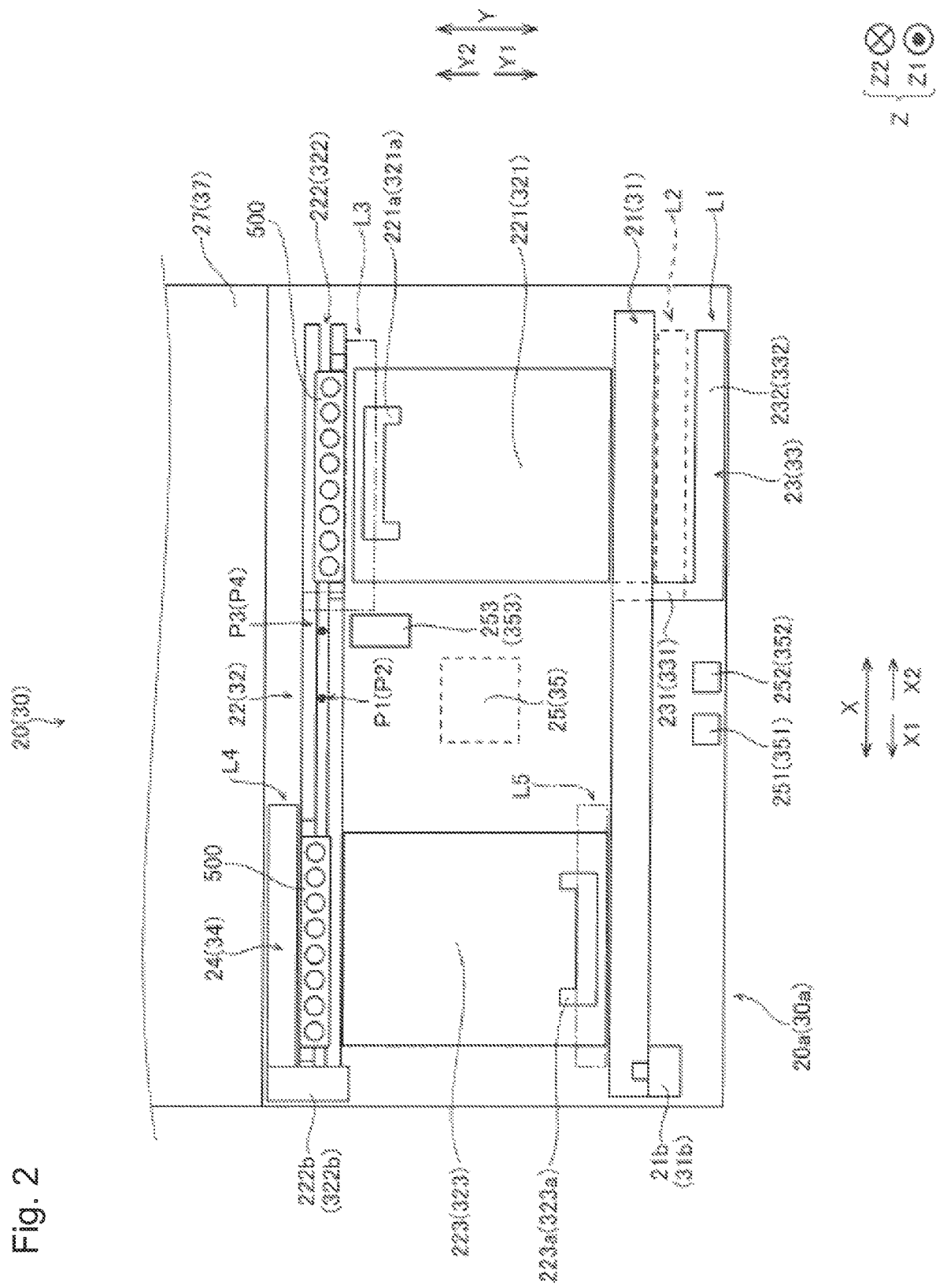
FIG. 2 is a schematic diagram illustrating a test device according to the first embodiment in a planar fashion.

In a preferred embodiment, test system 10 illustrated in FIG. 1 is a urine test system for performing a urine test. Test system 10 includes test device 20 and test device 30. Preferably, test device 20 and test device 30 are each a urine particle test device (see FIG. 17), which is configured to transport a urine sample held in rack 500 to a first loading position P1 and to test urine particles.

In the preferred embodiment, test system 10 further includes test device 300. Preferably, test device 300 is a urine qualitative test device (see FIG. 16), which is configured to transport the urine sample held in rack 500 and to qualitatively test elements in the urine.

Test device 20, test device 30, and test device 300 are disposed adjacent to one another. Test device 300 is disposed on the most upstream side, test device 20 is disposed on the downstream side thereof, and test device 30 is disposed at the most downstream side. Transport paths of the respective test devices are connected to one another so as to enable delivery of rack 500.

Test device 20 includes transport unit 20a, measurement unit 27, and IPU (Information Processing Unit) 220 formed from a computer. Test device 30 includes transport unit 30a, measurement unit 37, and IPU 230. Each IPU analyzes measurement data obtained by measurement of the urine sample by the measurement unit, thereby creating a test result. Here, although IPU 220 (230) is incorporated into measurement unit 27 (37), which performs the measurement of the sample in this embodiment, measurement unit 27 (37) and IPU 220 (230) may be provided separately.

Each of IPUs 220 and 230 (see FIG. 3) can be formed from a computer. Although illustration is omitted, IPU 220 (230) includes a CPU, a ROM (read only memory), a RAM (random access memory), a storage device such as a hard disk, an input-output interface, a communication interface, and the like. The computer functions as IPU 220 (230) by causing the CPU to execute a control computer program loaded in the RAM. The control computer program for causing the computer to function as IPU 220 (230), and data used for execution of the program are installed in the storage device. An input device such as a keyboard and a mouse is connected to the input-output interface, so that IPU 220 (230) can accept an input operation from a user. IPU 220 (230) is connected to host computer 210 through the communication interface. Moreover, IPU 220 (230) is equipped with a display device such as a liquid crystal display, and is able to display a control screen and test result data on the display device.

Each of test device 20 and test device 30 can be operated in a system measurement mode. When each test device 20 or 30 is set in the system measurement mode, rack 500 is assigned thereto by master control unit 25 (see FIG. 3) to be described later. Each test device 20 or 30 automatically accepts assigned rack 500, transports rack 500 to each of sample loading positions P1 and P2, and performs the urine test.

In addition, each of test device 20 and test device 30 can be operated in a stand-alone measurement mode to perform the test of the sample independently. When set in the stand-alone measurement mode, each test device 20 or 30 can perform the test while transporting rack 500 set manually by a user. In this case, rack 500 is not assigned to the test device that is set in the stand-alone measurement mode. Accordingly, even if a sample that needs to be urgently tested comes into being, it is possible to handle the sample by changing either test device 20 or test device 30 into the stand-alone measurement mode.

Test system 10 is communicably connected to host computer 210. Host computer 210 stores measurement orders of respective urine samples, and transmits a measurement order in response to a request from each test device. Host computer 210 receives and stores a test result, which is obtained by each test device in accordance with the measurement order.

Configuration of Transport Unit

A configuration of transport unit 20a of test device 20 is described with reference to FIG. 2. Note that in this specification, a direction to first bypass transport unit 21 viewed from measurement unit 27 of test device 20 is referred to as forward (a Y1 direction). Meanwhile, in a state where test device 20 is installed, a vertically downward direction is referred to as downward (a Z2 direction).

As major components for transporting rack 500, transport unit 20a includes first bypass transport unit 21, first supply transport unit 22, first movable member 23, and second movable member 24. As major components for controlling the transport, transport unit 20a includes master control unit 25 and storage unit 26 (see FIG. 3). By using first supply transport unit 22, transport unit 20a can transport a sample to the first loading position P1. By using first bypass transport unit 21, transport unit 20a can transport the sample to transport unit 30a connected on the downstream side in a transport direction while causing the sample to bypass the first loading position P1.

First bypass transport unit 21 is disposed on the Y1 side of test device 20. First bypass transport unit 21 includes a belt, which is driven by motor 21a (see FIG. 3). First bypass transport unit 21 can transport rack 500 loaded on the belt to test device 30 while causing rack 500 to bypass the first loading position P1. First bypass transport unit 21 can transport rack 500 in an X1 direction between an X2-side end portion and an X1-side end portion. Stop member 21b is disposed in the vicinity of the X1-side end portion of first bypass transport unit 21. Stop member 21b is movable to an interfering position on first bypass transport unit 21 and to a non-interfering position thereon.

First supply transport unit 22 is disposed on the Y2 side of first bypass transport unit 21. First supply transport unit 22 includes first holder 221, measurement line 222, and second holder 223.

First holder 221 is sandwiched between measurement line 222 and first bypass transport unit 21. First holder 221 includes stopper member 221a. Stopper member 221a is disposed in the vicinity of an end portion on the Y2 side of first holder 221. Stopper member 221a can project to an upper face (a Z1 direction) of first holder 221 by driving a not-illustrated motor. Thus, stopper member 221a can restrict movement of rack 500 to measurement line 222, and retain rack 500, which contains the sample before being tested, in first holder 221.

Measurement line 222 includes two belts, which are arranged in parallel. These belts are driven by motor 222a (see FIG. 3). Measurement line 222 transports the sample supplied from first holder 221 toward second holder 223 via the first loading position P1 where the sample is loaded. By using the two belts, measurement line 222 can hold two racks 500 respectively in different positions along an X axis, and transport racks 500 individually. Stop member 222b, which stops racks 500 so as not to move to the X1 side, is provided at an X1-side end portion of measurement line 222.

Here, transport unit 20a is provided with information read unit 253, which reads sample information attached to the samples that are transported to measurement line 222. The sample information at least includes ID information, which uniquely identifies each sample, and is recorded in a bar code or two-dimensional code format, for example. Based on this sample information, it is possible to identify each sample held in rack 500 and to acquire the measurement order of the identified sample from host computer 210. Information read unit 253 is a reader device, which reads a bar code or a two-dimensional code attached to each sample container, for example. Information read unit 253 reads the sample information from the sample located at a reading position P3 between an upstream end portion of measurement line 222 and the first loading position P1. The sample information acquired by information read unit 253 is transmitted to IPU 220 through master control unit 25. Test device 20 is configured to conduct a test of the sample based on the read sample information. Here, the sample information may be recorded on a record medium such as an RFID tag, and information read unit 253 may be a reader device configured to read information from the record medium such as the RFID tag.

Second holder 223 is sandwiched between measurement line 222 and first bypass transport unit 21. Preferably, second holder 223 includes stopper member 223a. Stopper member 223a is disposed in the vicinity of an end portion on the Y1 side of second holder 223. Stopper member 223a can project upward from an upper face of second holder 223 by driving a not-illustrated motor. Thus, it is possible to restrict movement of rack 500 to first bypass transport unit 21 side (the Y1 side). Preferably, second holder 223 is capable of storing rack 500 that stores tested samples by use of stopper member 223a. Note that in the first embodiment, test device 20 can be used in the state where stopper member 223a is caused to constantly project upward from the upper face of second holder 223. Rack 500 retained in second holder 223 can be taken out of test device 20 by a user.

In a plan view, first movable member 23 is formed substantially into an L-shape. First movable member 23 includes first portion 231 and second portion 232. First movable member 23 is movable along the Y axis by a drive force of motor 233 (see FIG. 3). Specifically, first movable member 23 can move along the Y axis between an origin position L1 where first portion 231 and second portion 232 do not interfere with a portion on first bypass transport unit 21 and a backmost position L3 where rack 500 is fed to measurement line 222. Meanwhile, first movable member 23 can be disposed at a stop position L2 where first portion 231 interferes with the portion on first bypass transport unit 21 while second portion 232 does not interfere with the portion on first bypass transport unit 21. In the state where first movable member 23 is located at the stop position L2, the movement of rack 500 to be transported on first bypass transport unit 21 is stopped by first portion 231.

First portion 231 is formed at an end portion in the X1 direction of second portion 232 in such a way as to extend in the Y2 direction. First portion 231 is provided for the purpose of stopping rack 500 that moves on first bypass transport unit 21.

Figure 3:
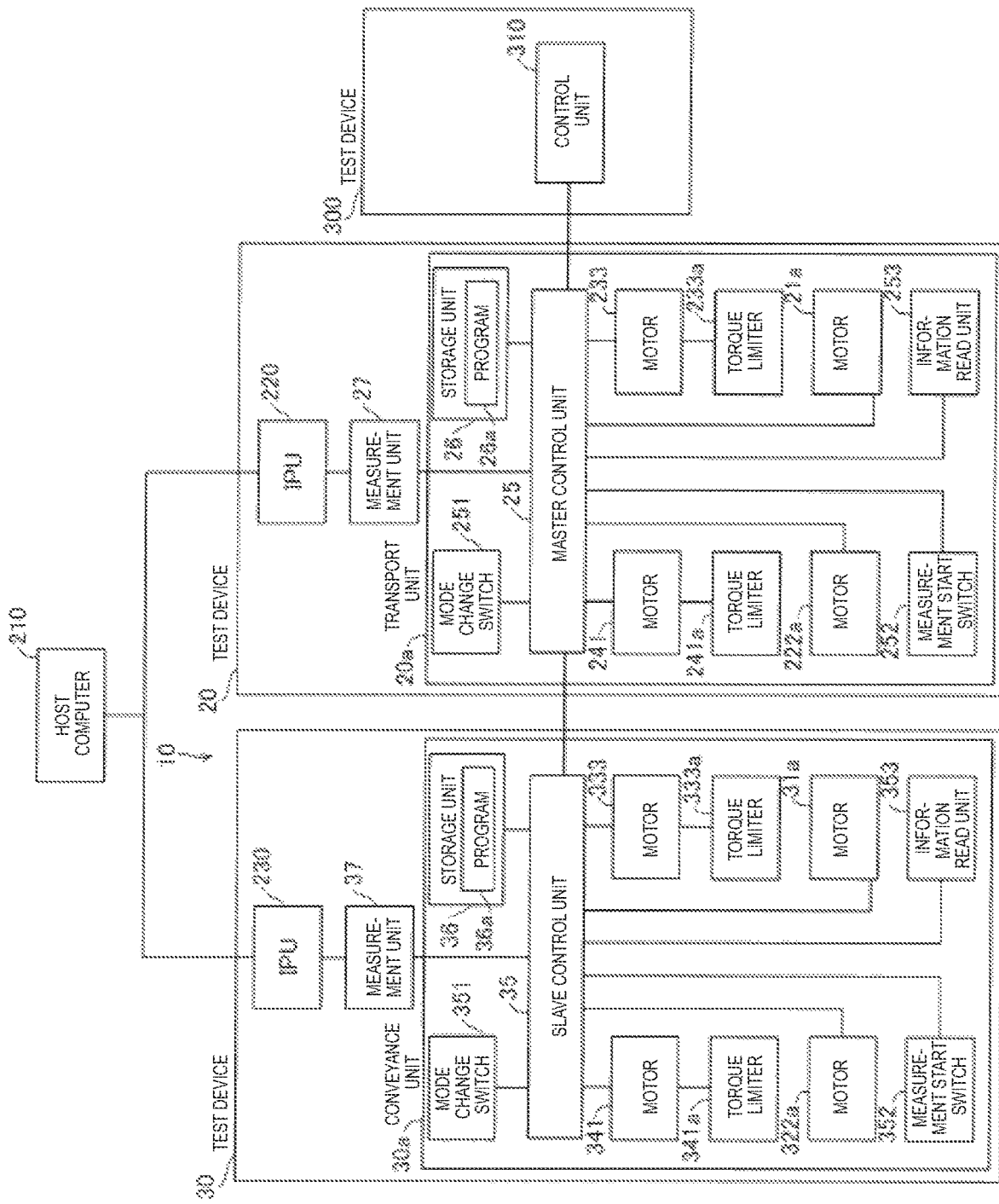
FIG. 3 is a block diagram illustrating the test system according to the first embodiment.

A power transmission mechanism for transmitting the drive force from motor 233 to first movable member 23 includes torque limiter 233a (see FIG. 3). The power transmission mechanism transmits the drive force from motor 233 to first movable member 23 via torque limiter 233a. Torque limiter 233a is configured to shut off the transmission of the drive force from motor 233 upon application of a load equal to or above a certain level.

In a plan view, second movable member 24 is formed into a rectangular shape, which extends along the X axis. Second movable member 24 is moved along the Y axis by a drive force of motor 241 (see FIG. 3). Specifically, second movable member 24 can move between an origin position L4 where second movable member 24 does not interfere with a portion on measurement line 222 and a foremost position L5 where rack 500 is disposed in second holder 223. A power transmission mechanism for transmitting the drive force from motor 241 to second movable member 24 includes torque limiter 241a (see FIG. 3). Here, configurations of motor 241 and torque limiter 241a are respectively the same as those of motor 233 and torque limiter 233a, and descriptions thereof are omitted.

Master control unit 25 includes a CPU (Central Processing Unit). Preferably, master control unit 25 is built in transport unit 20a. A program for causing the CPU to function as master control unit 25 is stored in storage unit 26. Master control unit 25 executes program 26a and thereby performs assignment of racks 500 to test device 20 and the test device 30, which are set in the system measurement mode, and control of transport operations of first supply transport unit 22 and first bypass transport unit 21.

Master control unit 25 is communicably connected to control unit 310 of test device 300. Master control unit 25 is communicably connected to slave control unit 35 of test device 30. Master control unit 25 is communicable with IPU 230 via slave control unit 35. Accordingly, master control unit 25 can acquire information from IPU 230 as to whether or not test device 30 is operated normally.

Next, transport unit 30a of test device 30 is described.

As components for transporting rack 500, transport unit 30a of test device 30 includes second bypass transport unit 31, second supply transport unit 32, first movable member 33, and second movable member 34. The components of transport unit 30a for transporting rack 500 are the same as those of test device 20 and descriptions thereof are omitted accordingly.

As components for controlling the transport, transport unit 30a includes slave control unit 35 and storage unit 36 (see FIG. 3). Program 36a for causing the CPU to function as slave control unit 35 is stored in storage unit 36. Slave control unit 35 executes program 36a and thereby controls an operation to transport rack 500 assigned to test device 30 by master control unit 25. Program 26a and program 36a may be a common program. In this case, the program may be designed to be capable of selecting whether the CPU executing the program is caused to function as the master control unit or the CPU is caused to function as the slave control unit. Preferably, slave control unit 35 is built in transport unit 30a. Meanwhile, transport unit 30a is provided with information read unit 353. Information read unit 353 reads the sample information from the sample located at a reading position P4 between an upstream end portion of measurement line 322 and a second loading position P2. The sample information acquired by information read unit 353 is transmitted to IPU 230 through slave control unit 35. Test device 30 is configured to conduct a test of the sample based on the read sample information.

Assignment Processing by Master Control Unit

Next, assignment processing by master control unit 25 is described with reference to FIG. 2 and FIG. 4. This processing is conducted by master control unit 25.

Figure 4:
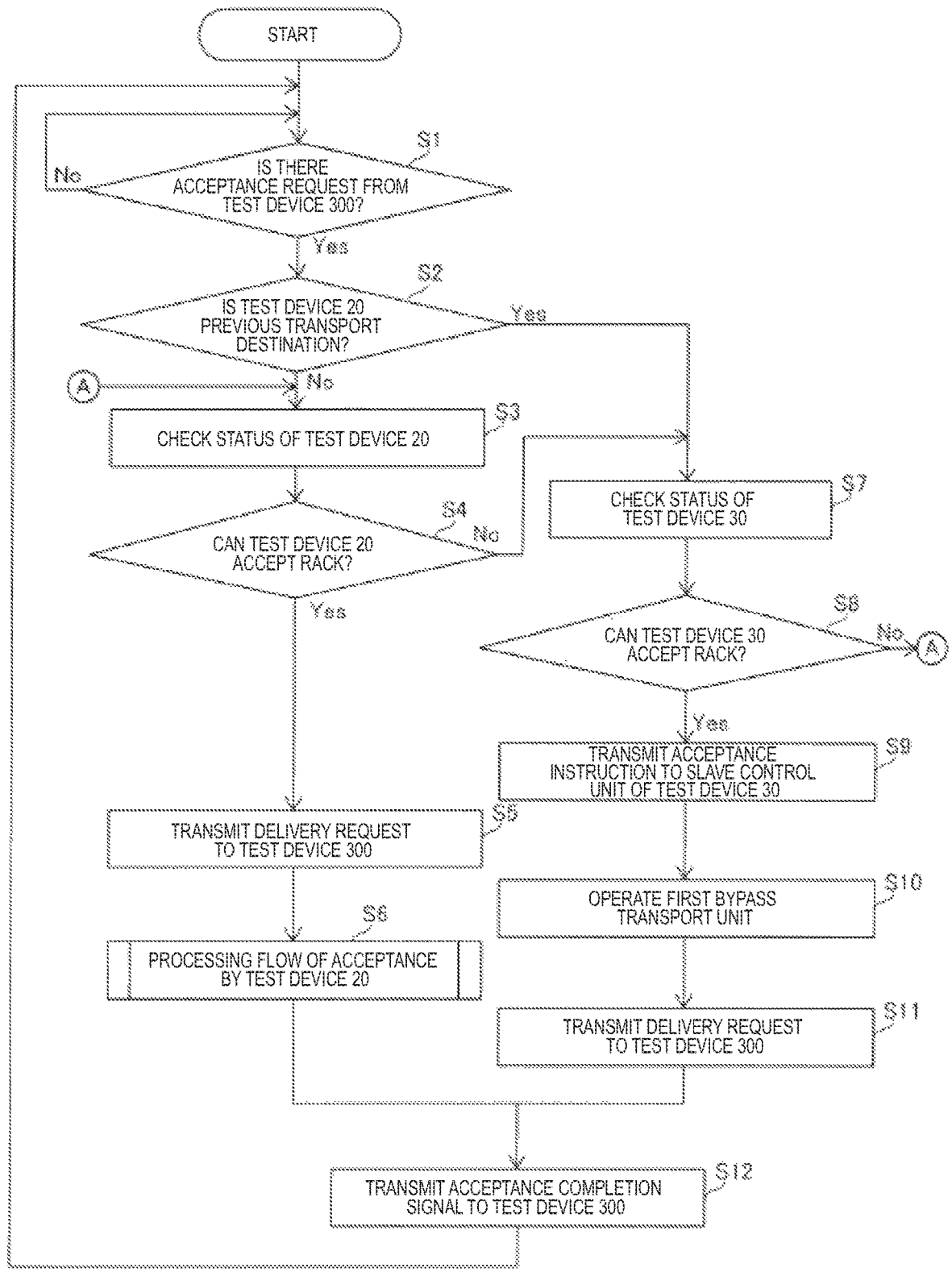
FIG. 4 is a flowchart for explaining assignment processing by a master control unit of the test system according to the first embodiment.

In step S1 of FIG. 4, master control unit 25 determines whether or not there is an acceptance request from test device 300. Master control unit 25 repeats this determination until there is the acceptance request from control unit 310 of test device 300. When there is the acceptance request, master control unit 25 moves the processing to step S2.

In step S2, master control unit 25 determines whether or not test device 20 is a previous transport destination of rack 500. Preferably, master control unit 25 performs the allocation of samples to test device 20 and test device 30 by rotation in a predetermined cycle. Specifically, master control unit 25 allocates racks 500 alternately to test device 20 and test device 30. Thus, it is possible to prevent workloads from being unevenly applied to one of the test devices, and thereby to improve test efficiency.

When test device 20 is not the previous transport destination of rack 500 (when test device 30 is the previous transport destination), master control unit 25 moves the processing to step S3. On the other hand, when test device 20 is the previous transport destination of rack 500, master control unit 25 moves the processing to step S7. Here, in the case of the first time, master control unit 25 moves the processing to step S3 so as to assign rack 500 to test device 20.

In step S3, master control unit 25 checks the status of test device 20. Specifically, master control unit 25 checks the status of test device 20 in order to determine whether or not test device 20 falls into a condition of being capable of accepting rack 500 (hereinafter referred to as an acceptability condition). The acceptability condition means a condition in which test device 20 satisfies three requirements, namely, that test device 20 is normally operated, that test device 20 is not set in the stand-alone measurement mode, and that first holder 221 of test device 20 is not in a full load condition.

In step S4, master control unit 25 determines whether or not test device 20 can accept rack 500. Specifically, when master control unit 25 determines that test device 20 satisfies the acceptability condition on the basis of the status of test device 20 checked in step S3, master control unit 25 determines that test device 20 can accept rack 500 and moves the processing to step S5. On the other hand, master control unit 25 moves the processing to step S7 if master control unit 25 determines that test device 20 does not satisfy the acceptability condition on the basis of the status of test device 20 checked in step S3. In steps S7 and S8, master control unit 25 checks the status of test device 30 and determines whether or not test device 30 can accept rack 500 as described later. When test device 30 can accept rack 500, master control unit 25 assigns rack 500 to test device 30. Accordingly, master control unit 25 does not assign any samples to a test device causing an error, a test device set in the stand-alone measurement mode, or a test device of which first holder is in a full load condition. As a consequence, it is possible to inhibit the test from stopping.

In step S5, master control unit 25 transmits a delivery request to test device 300. Upon receipt of the delivery request, test device 300 transports rack 500 to test device 20.

In step S6, master control unit 25 executes an acceptance processing flow by test device 20. Details of step S6 are described later with reference to FIG. 5. Thereafter, master control unit 25 moves the processing to step S12.

On the other hand, when the processing moves from step S2 to step S7, master control unit 25 checks the status of test device 30. Specifically, as with step S3, master control unit 25 checks the status of test device 30 in order to determine whether or not test device 30 falls into the acceptability condition. To be more precise, by means of communication with slave control unit 35, master control unit 25 checks the status of test device 30 in light of three requirements, namely, that test device 30 is normally operated, that test device 30 is not set in the stand-alone measurement mode, and that first holder 321 of test device 30 is not in a full load condition. Here, regarding the requirement that test device 30 is normally operated out of the acceptability condition of test device 30, master control unit 25 checks the requirement on the basis of information acquired from IPU 230 through the intermediary of slave control unit 35.

In step S8, master control unit 25 determines whether or not test device 30 can accept rack 500. Specifically, when master control unit 25 determines that test device 30 satisfies the acceptability condition on the basis of the status of test device 30 checked in step S7, master control unit 25 determines that test device 30 can accept rack 500 and moves the processing to step S9. On the other hand, master control unit 25 moves the processing to step S3 if master control unit 25 determines that test device 30 does not satisfy the acceptability condition on the basis of the status of test device 30 checked in step S7. In steps S3 and S4, master control unit 25 checks the status of test device 20 and determines whether or not test device 20 can accept rack 500 as described previously. When test device 20 can accept rack 500, master control unit 25 assigns rack 500 to test device 20.

As described above, when one of the test devices cannot accept rack 500, master control unit 25 determines whether or not the other test device can accept rack 500, thereby assigning rack 500 to the test device that can accept rack 500. Thus, the transport of rack 500 is not disrupted even when one of the test devices cannot accept rack 500. Here, if none of the test devices can accept rack 500, master control unit 25 repeats the processing in steps S3, S4, S7, and S8 and stands by until one of the test devices becomes capable of accepting rack 500.

In step S9, master control unit 25 transmits an acceptance instruction to slave control unit 35 of test device 30. Upon receipt of the acceptance instruction, slave control unit 35 starts drive of a belt by second bypass transport unit 31 and locates first movable member 33 at the stop position L2. Details of processing conducted by slave control unit 35 after step S9 are described later with reference to FIG. 6.

In step S10, master control unit 25 starts the drive of the belt by first bypass transport unit 21. At this time, first movable member 23 of test device 20 is located at the origin position L1.

In step S11, master control unit 25 transmits a delivery request to test device 300. Upon receipt of the delivery request, test device 300 transports rack 500 to test device 20. Thus, rack 500 is passed through test device 20 and transported to test device 30.

In step S12, master control unit 25 transmits an acceptance completion signal to test device 300. When there is a rack 500 to be tested next in test device 20 or test device 30, control unit 310 of test device 300 transmits an acceptance request for next rack 500 to master control unit 25. Thereafter, master control unit 25 puts the processing back to step S1.

While master control unit 25 can be operated in the stand-alone measurement mode and in the system measurement mode as described previously, master control unit 25 executes the allocation processing of FIG. 4 regardless of which mode is applied. In other words, even when test device 20 is set in the stand-alone measurement mode, master control unit 25 can continuously execute the determination of the transport destination of the sample, and the issuance of the instructions to slave control unit 35. In this case, master control unit 25 executes the control of the transport of the rack by test device 20 in the stand-alone measurement mode (step S57 in FIG. 9) in parallel with the allocation processing of FIG. 4. It is therefore not necessary to interrupt system measurement even in a situation where test device 20 including master control unit 25 needs to be set in the stand-alone measurement mode.

Acceptance Processing by Master Control Unit

Figure 5:
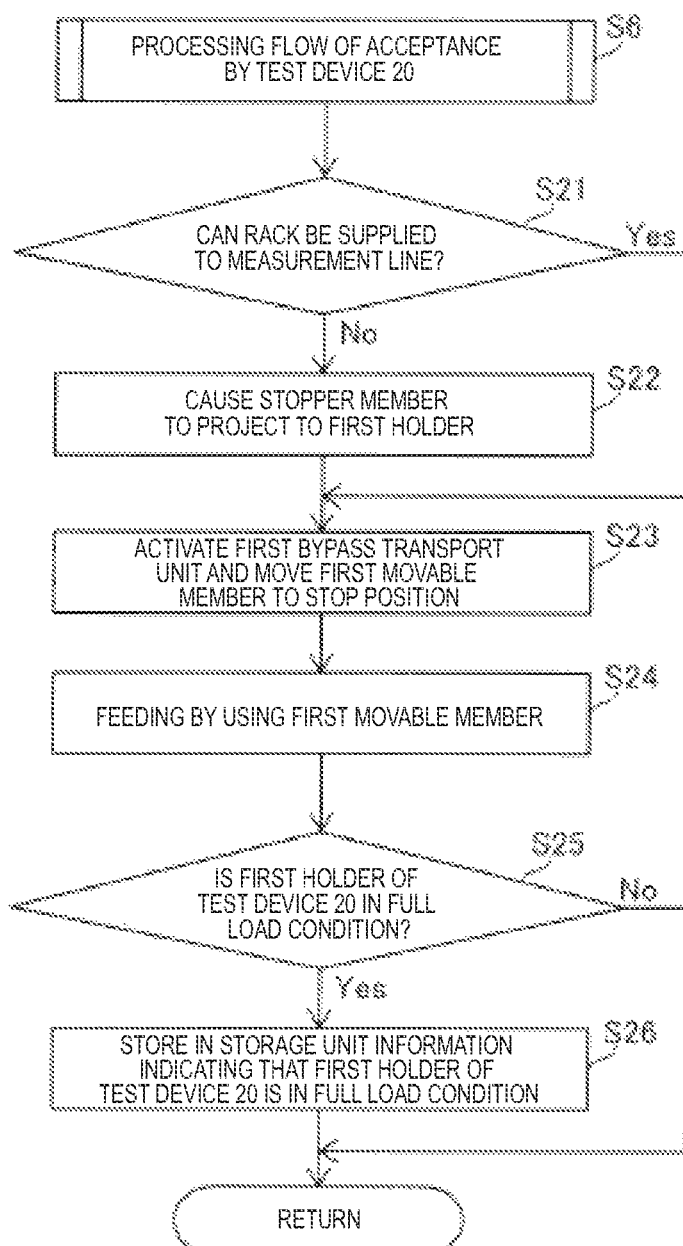
FIG. 5 is a flowchart for explaining acceptance processing by the master control unit of the test system according to the first embodiment.

Next, acceptance processing by master control unit 25 is described with reference to FIG. 2, FIG. 3, and FIG. 5. This processing is a subroutine of step S6 in the allocation processing (see FIG. 4), which is conducted by master control unit 25.

In step S21, master control unit 25 determines whether or not rack 500 can be supplied to measurement line 222. The state where rack 500 can be supplied to measurement line 222 is a state where at least one of the two belts of measurement line 222 does not hold rack 500, i.e., a state where the belt is empty. When master control unit 25 determines that rack 500 cannot be supplied to measurement line 222, master control unit 25 moves the processing to step S22. On the other hand, when master control unit 25 determines that rack 500 can be supplied to measurement line 222, master control unit 25 moves the processing to step S23.

In step S22, master control unit 25 causes stopper member 221*a* to project to first holder 221.

In step S23, master control unit 25 activates first bypass transport unit 21 and moves first movable member 23 to the stop position L2. Thus, rack 500 delivered from test device 300 is transported in the X1 direction by first bypass transport unit 21, and comes into contact with first portion 231 (see FIG. 2) of first movable member 23 and is hence stopped. An arrival of rack 500 at a rack stop position by means of first movable member 23 is detected with a not-illustrated sensor.

When rack 500 arrives at the rack stop position, master control unit 25 performs feed processing by using first movable member 23 in step S24. Specifically, master control unit 25 drives motor 233 in such a drive amount to move first movable member 23 to the backmost position L3, and moves rack 500 in the Y2 direction. At this time, the arrival position of rack 500 varies depending on whether stopper member 221*a* is projecting or not projecting.

When stopper member 221*a* is projecting, rack 500 pushed by first movable member 23 comes into contact with stopper member 221*a* and is hence stopped. When rack 500 is stopped, a load equal to or above a certain level is applied to torque limiter 233*a* (see FIG. 3) by the drive force of motor 233 (see FIG. 3) that attempts to drive first movable member 23 further, whereby the transmission of the drive force is shut off. As a consequence, motor 233 runs idle and the remaining drive amount provided to first movable member 23 is depleted. When different racks 500 are already present in first holder 221, all racks 500 in first holder 221 are pushed backward (in the Y2 direction) by first movable member 23. The load applied to torque limiter 233*a* becomes equal to or above the certain level when leading rack 500 comes into contact with stopper member 221*a*, whereby torque limiter 233*a* is activated and first movable member 23 is stopped.

When stopper member 221*a* is not projecting, rack 500 pushed by first movable member 23 goes beyond first holder 221 and is fed to measurement line 222. When different racks 500 are already present in first holder 221, all racks 500 in first holder 221 are pushed backward (in the Y2 direction) by first movable member 23. The load applied to torque limiter 233*a* becomes equal to or above the certain level when leading rack 500 is fed to measurement line 222, whereby torque limiter 233*a* is activated and first movable member 23 is stopped. Rack 500 fed to measurement line 222 is transported in accordance with steps S44 and S45 of FIG. 7 to be described later.

When the drive amount is depleted, master control unit 25 puts first movable member 23 back to the origin position L1.

In step S25, master control unit 25 determines whether or not first holder 221 of test device 20 is in the full load condition on the basis of the number of pulses of motor 233 when first movable member 23 returns to the origin position L1. The number of pulses generated by motor 233 when first movable member 23 returns to the origin position L1 corresponds to the position on the Y axis of rack 500 located on the foremost side (in the Y1 direction) in first holder 221. This corresponds to the number of racks 500 present in first holder 221. Accordingly, master control unit 25 can calculate the number of racks 500 in first holder 221 on the basis of the number of pulses during the return to the origin position L1, and determine whether or not first holder 221 is in the full load condition based thereon. When master control unit 25 determines that first holder 221 is in the full load condition, master control unit 25 moves the processing to step S26. On the other hand, when master control unit 25 determines that first holder 221 is not in the full load condition, master control unit 25 terminates the acceptance processing and moves the processing to step S12 (see FIG. 4).

In step S26, master control unit 25 performs processing to store information, which indicates that first holder 221 of test device 20 is in the full load state, in storage unit 26. Thereafter, master control unit 25 terminates the acceptance processing and moves the processing to step S12 (see FIG. 4).

Acceptance Processing by Slave Control Unit

Figure 6:
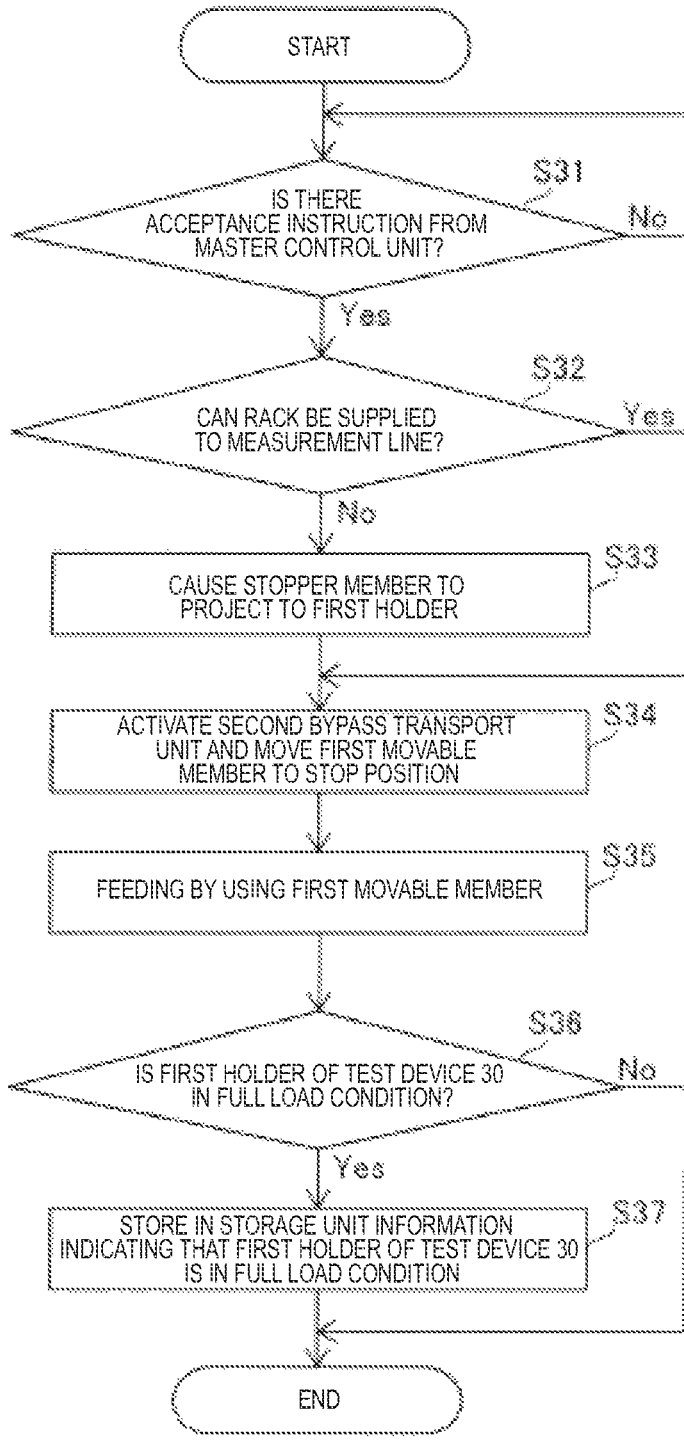
FIG. 6 is a flowchart for explaining acceptance processing by a slave control unit of the test system according to the first embodiment.

Next, acceptance processing by slave control unit 35 is described with reference to FIG. 2 and FIG. 6. This processing is conducted by slave control unit 35.

In step S31, slave control unit 35 determines whether or not there is the acceptance instruction for rack 500 from master control unit 25. Specifically, slave control unit 35 determines whether or not the acceptance instruction for rack 500 is received from master control unit 25 as a consequence of step S9 in the allocation processing (see FIG. 4). Slave control unit 35 repeats this determination until there is the acceptance instruction for rack 500 from master control unit 25. When there is the acceptance request, slave control unit 35 moves the processing to step S32.

In step S32, slave control unit 35 determines whether or not rack 500 can be supplied to measurement line 322. When slave control unit 35 determines that rack 500 cannot be supplied to measurement line 322, slave control unit 35 moves the processing to step S33. On the other hand, when slave control unit 35 determines that rack 500 can be supplied to measurement line 322, slave control unit 35 moves the processing to step S34.

In step S33, slave control unit 35 causes stopper member 321a to project to first holder 321.

In step S34, slave control unit 35 activates second bypass transport unit 31 and moves first movable member 33 to the stop position L2. Thus, rack 500 having passed through test device 20 is transported in the X1 direction by second bypass transport unit 31, and comes into contact with first portion 331 (see FIG. 2) of first movable member 33 and is hence stopped. An arrival of rack 500 at a rack stop position by means of first movable member 33 is detected with a not-illustrated sensor.

In step S35, slave control unit 35 performs processing to feed rack 500 into first holder 321. Specifically, slave control unit 35 drives motor 333 in such a drive amount to move first movable member 33 to the backmost position L3. Thereafter, slave control unit 35 puts first movable member 33 back to the origin position L1.

In step S36, slave control unit 35 determines whether or not first holder 321 of test device 30 is in the full load condition. When slave control unit 35 determines that first holder 321 is in the full load condition based on the number of return pulses of motor 333 when first movable member 33 returns to the origin position L1, slave control unit 35 moves the processing to step S37. On the other hand, the slave control unit 35 terminates the acceptance processing when slave control unit 35 determines that first holder 321 is not in the full load condition.

In step S37, slave control unit 35 performs the processing to store information, which indicates that first holder 321 of test device 30 is in the full load state, in storage unit 36. Thereafter, slave control unit 35 terminates the acceptance processing.

Transport Processing by Test Devices

Figure 7:
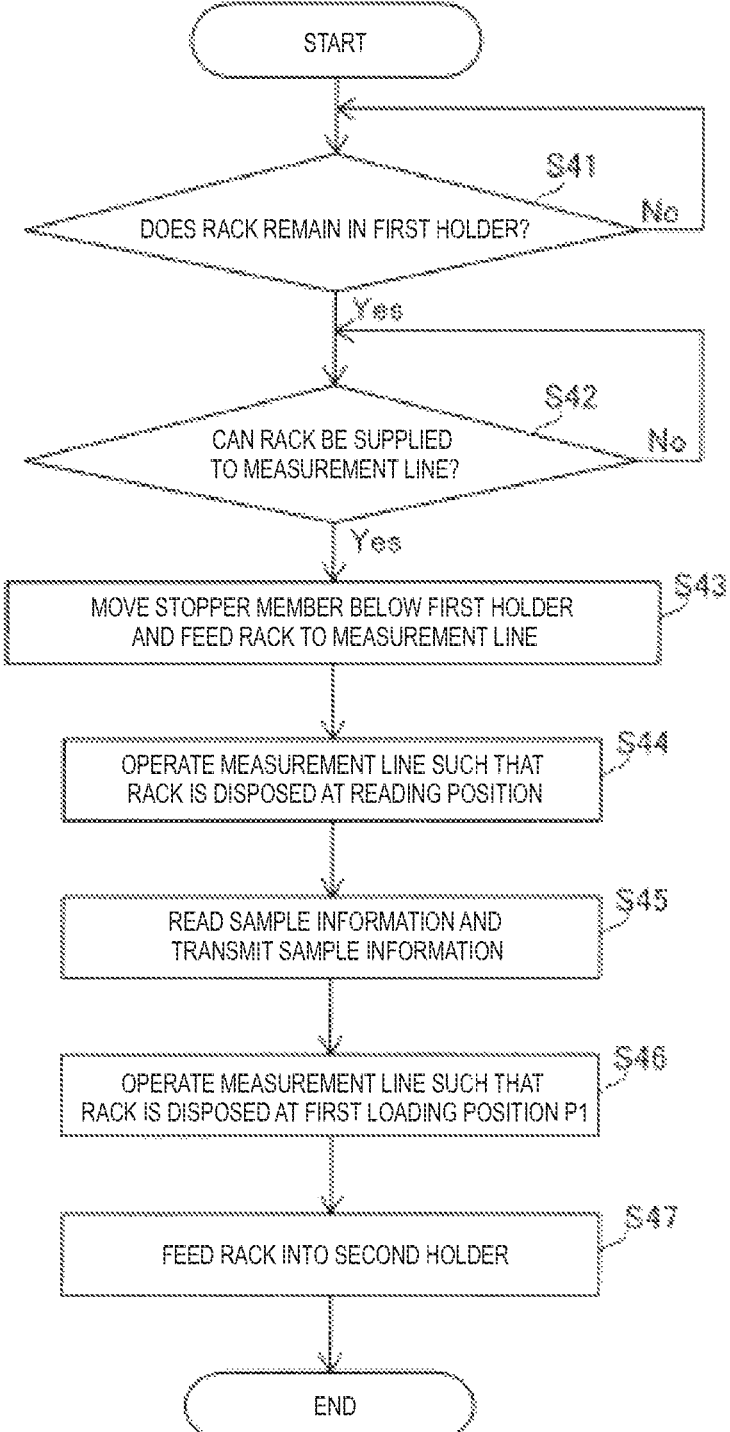
FIG. 7 is a flowchart for explaining processing of transport to a loading position by the master control unit and the slave control unit of the test system according to the first embodiment.

Next, processing of transport to the loading position by test device 20 is described with reference to FIG. 2 and FIG. 7. This processing is conducted by master control unit 25. This processing is processing to be executed both in the system measurement mode and in the stand-alone measurement mode. Note that in the test device 30, the same transport processing as that of test device 20 is conducted by slave control unit 35 as well. For this reason, only the processing of transport to the loading position by test device 20 is described herein and the description concerning the processing of transport to the loading position by test device 30 is omitted.

In step S41, master control unit 25 determines whether or not rack 500 remains in first holder 221. Master control unit 25 repeats this processing until master control unit 25 determines that rack 500 remains in first holder 221. Master control unit 25 moves the processing to step S42 when master control unit 25 determines that rack 500 remains in first holder 221.

In step S42, master control unit 25 determines whether or not rack 500 can be supplied to measurement line 222. Master control unit 25 repeats this processing until master control unit 25 determines that rack 500 can be supplied to measurement line 222. Master control unit 25 moves the processing to step S43 when master control unit 25 determines that rack 500 can be supplied to measurement line 222.

In step S43, master control unit 25 moves stopper member 221a below first holder 221 (in the Z2 direction), and performs processing to feed rack 500 to measurement line 222. In this case, master control unit 25 drives motor 233 in such a drive amount to move first movable member 23 to the backmost position L3. Here, when first holder 221 is in the full load condition at the point when step S43 is executed, master control unit 25 determines that first holder 221 in test device 20 is no longer in the full load condition as a consequence of the processing in step S43, and deletes the information indicating the full load condition, which is stored in storage unit 26 in step S26 (see the acceptance processing by master control unit 25 of FIG. 5).

In step S44, master control unit 25 operates measurement line 222 such that the sample containers held in rack 500 are disposed in order at the reading position P3. In step S45, master control unit 25 reads the sample information with information read unit 253. Information read unit 253 reads the sample information attached to the sample containers supplied to the reading position P3. Master control unit 25 acquires the read sample information from information read unit 253 and transmits the sample information to IPU 220. As a result of steps S44 and S45, the sample information on all the sample containers held in rack 500 is transmitted to IPU 220.

In step S46, master control unit 25 operates measurement line 222 such that sample containers held in rack 500 are disposed in order at the first loading position P1. Measurement unit 27 sequentially aspirates the samples from the sample containers supplied to the first loading position P1, and performs measurement concerning urine tests. When the samples are aspirated from all the sample containers held in rack 500, master control unit 25 moves measurement line 222 so as to transport rack 500 to the end portion on the X1-direction side.

In step S47, master control unit 25 performs processing to feed rack 500 into second holder 223. In this case, master control unit 25 drives motor 241 in such a drive amount to move second movable member 24 to the foremost position L5.

Sample Aspiration Processing

Next, sample aspiration processing in test device 20 and test device 30 is described with reference to FIG. 2, FIG. 3, and FIG. 8. This processing is processing on the part of measurement units 27 and 37 to be conducted in parallel with the transport processing illustrated in FIG. 7. This processing is conducted by measurement units 27 and 37 under control of IPU 220 and IPU 230. In the following, the sample aspiration processing by test device 20 is described as an example. However, the same processing is executed by test device 30 as well.

Figure 9:
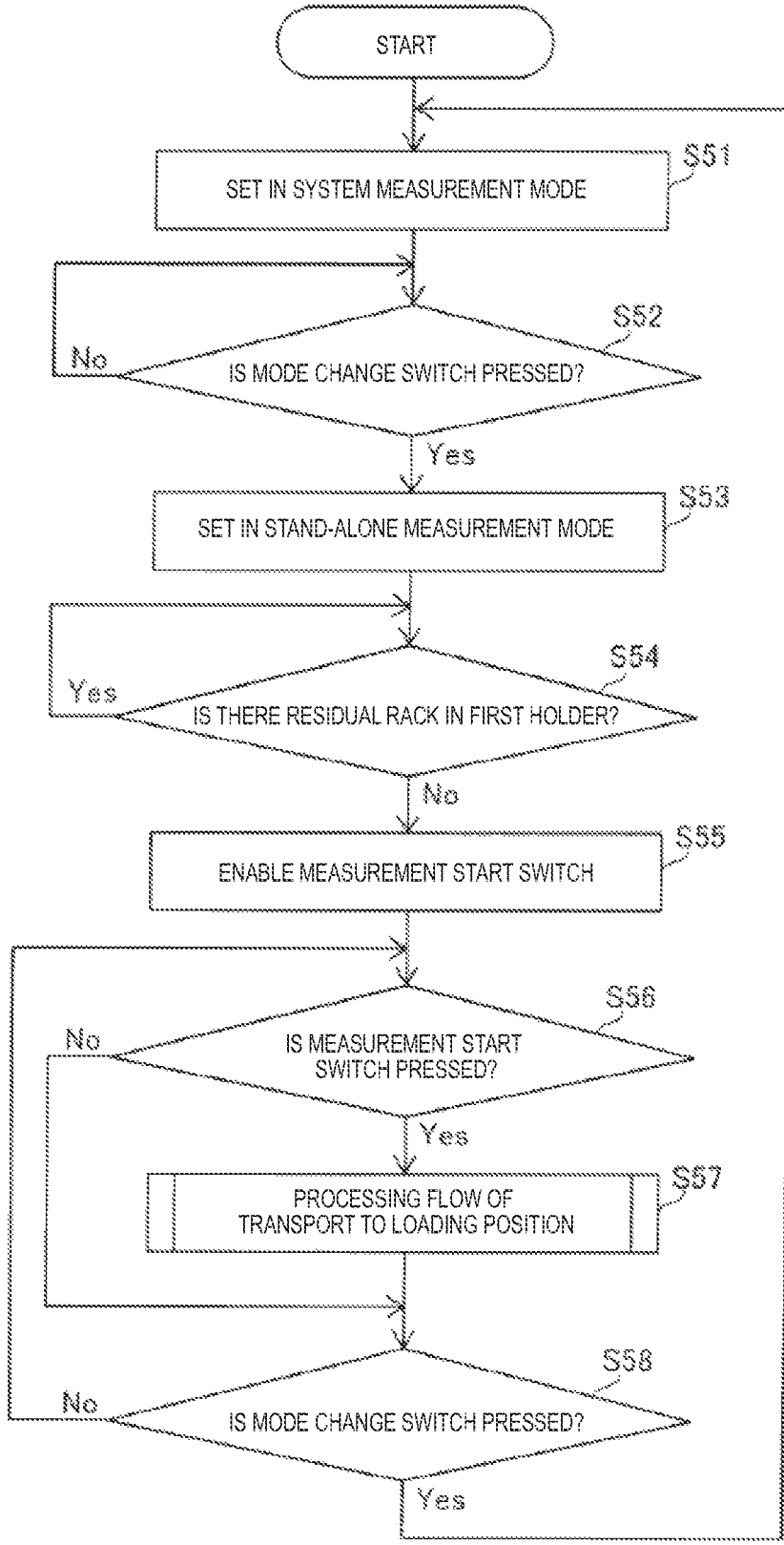
FIG. 9 is a flowchart for explaining mode change processing by the master control unit and the slave control unit of the test system according to the first embodiment.

In step S141 of FIG. 9, IPU 220 determines whether or not the sample information is acquired from master control unit 25. When the sample information is not acquired, IPU 220 stands by while repeating the determination of step S141 until the sample information is transmitted from master control unit 25.

When the sample information is acquired, IPU 220 sets the samples identified by the sample information as objects of aspiration in step S142. Accordingly, at the point when the sample information is read by information read unit 253 at the reading position P3, all the samples held in rack 500 are set as the objects of aspiration.

In step S143, IPU 220 inquires of host computer 210 about the measurement orders of the samples identified by the sample information. In step S144, IPU 220 determines whether or not there is the measurement order for each of the identified samples.

When there is the management order, IPU 220 causes measurement unit 27 to perform an operation to aspirate the sample in step S145. Specifically, when the sample for which the measurement order is determined to be present is transported to the first loading position P1, measurement unit 27 performs aspiration of the sample. In step S146, measurement unit 27 performs measurement of the aspirated sample.

On the other hand, when there is not the measurement order in step S144, IPU 220 excludes the sample without the measurement order from the objects of aspiration, thereby cancelling aspiration of this sample by measurement unit 27 in step S147. In other words, each sample whose sample information is read out at the reading position P3 is once set as the object of aspiration, and then the setting as the object of aspiration is cancelled if the measurement order for the relevant sample is determined to be not present. As a consequence, when the sample container for which the measurement order is determined to be not present is transported to the first loading position P1, the sample container skips the aspiration by measurement unit 27.

After step S146 or S147, IPU 220 brings the processing back to step S141, and performs the processing of the next sample.

Mode Change Processing

Next, mode change processing in test device 20 and test device 30 is described with reference to FIG. 2, FIG. 3, and FIG. 9. This processing is conducted by master control unit 25 and slave control unit 35. In the following, a case of being conducted by master control unit 25 is described as an example. Note that the same processing is executed by slave control unit 35 as well.

When test device 25 is started, master control unit 25 sets test device 20 in the system measurement mode in step S51.

In step S52, master control unit 25 determines whether or not mode change switch 251 (see FIG. 2) is pressed. Master control unit 25 repeats this processing until mode change switch 251 is operated by a user. When mode change switch 251 is operated, master control unit 25 moves the processing to step S53.

In step S53, master control unit 25 sets test device 20 in the stand-alone measurement mode. Master control unit 25 stores information, which indicates that the measurement mode is set in the stand-alone measurement mode, in storage unit 26 (see FIG. 3). Thus, assignment of samples to test device 20 is prohibited whereby test device 20 stops acceptance of new rack 500 into first holder 221. Accordingly, master control unit 25 can transport rack 500 from test device 300 to test device 30 while operating test device 20 alone.

In step S54, master control unit 25 determines whether or not residual rack 500 remains in first holder 221. In other words, master control unit 25 determines whether or not there is rack 500, which is accepted by first holder 221 in the system measurement mode but the measurement thereof is yet to be completed. When there is remaining rack 500, master control unit 25 repeats this determination until no rack 500 remains in first holder 221. The transport processing flow in FIG. 7 is continued during this period as well. Accordingly, even in the case of setting in the stand-alone measurement mode, the transport to the first loading position P1 and the measurement of the samples are continued regarding rack 500 remaining in first holder 221.

When there is no rack 500 remaining in first holder 221, in step S55, master control unit 25 enables measurement start switch 252 (see FIG. 2) provided to test device 20. Measurement start switch 252 is a switch for instructing start of the measurement of rack 500 set in first holder 221 in the stand-alone measurement mode. Accordingly, by enabling measurement start switch 252 in step S55, the user can set rack 500 in first holder 221 and execute the measurement in the stand-alone measurement mode.

In step S56, master control unit 25 determines whether or not measurement start switch 252 is pressed. When measurement start switch 252 is pressed, master control unit 25 moves the processing to step S57. When measurement start switch 252 is not pressed, master control unit 25 moves the processing to step S58.

In step S57, master control unit 25 executes a processing flow of transport to the loading position regarding rack 500 set in first holder 221 by the user. Specifically, as illustrated in FIG. 7, master control unit 35 determines whether or not rack 500 is set in first holder 221 by the user (S41). When rack 500 is set therein, master control unit 25 determines whether or not rack 500 can be supplied to measurement line 222 (S42). When rack 500 can be supplied thereto, master control unit 25 feeds rack 500 to measurement line 222, and controls transport unit 20a in such a way as to transport rack 500 to the reading position P3 and the first sample loading position P1 (S43, S44, and S46) in order. Master control unit 25 transmits the read sample information to IPU 220 (S45). Measurement unit 27 loads the samples and performs the urine tests based on the sample information. When the urine tests are completed, master control unit 25 controls transport unit 20a in such a way as to feed rack 500 into second holder 223 (S47). This processing flow is the same as the processing described by using FIG. 7 and detailed descriptions are therefore omitted.

In step S58, master control unit 25 determines whether or not mode change switch 251 is pressed. Master control unit 25 puts the processing back to step S51 when mode change switch 251 is pressed. Master control unit 25 puts the processing back to step S56 when mode change switch 251 is not pressed.

According to the first embodiment, the samples can be assigned to test device 20 and test device 30 by using master control unit 25 of test device 20. Thus, the assignment of the samples previously performed by a dedicated computer as a transport controller can be realized by use of the control unit of transport unit 30a. Thus, it is possible to simplify test system 10.

Second Embodiment

A configuration of test system 100 according to a second embodiment is described below with reference to FIG. 2, FIG. 10, and FIG. 11.

This second embodiment describes test system 100 configured to collect rack 500 containing tested samples by use of collection system 400 installed on the X1 side of test device 30, which is different from the first embodiment that is configured to retain rack 500 containing the tested samples in second holder 223. Note that the same components as those in the above-described first embodiment are denoted by the same reference numerals and descriptions thereof are omitted.

Figure 10:
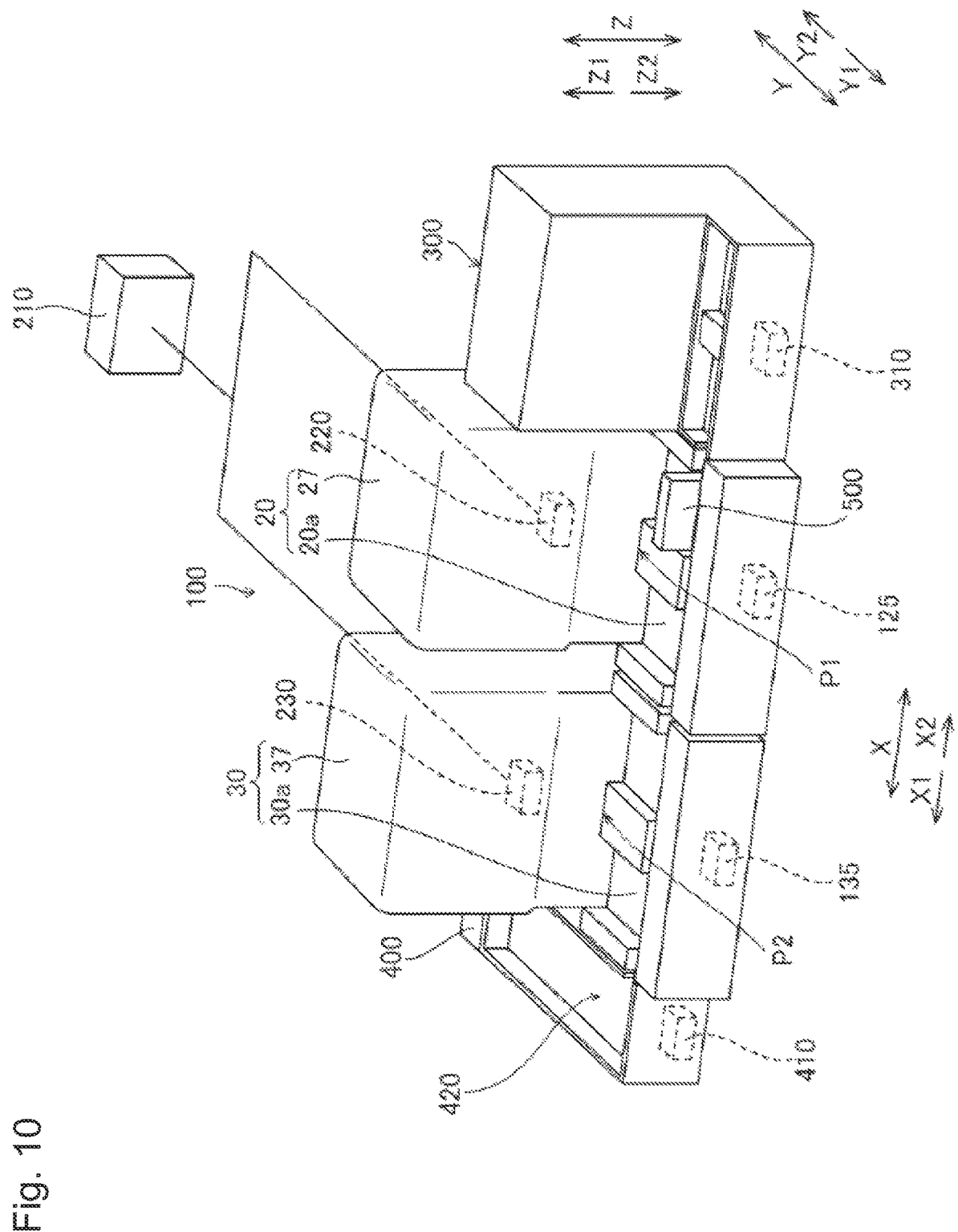
FIG. 10 is a diagram illustrating a state where a test system according to a second embodiment is connected to another device.
Figure 11:
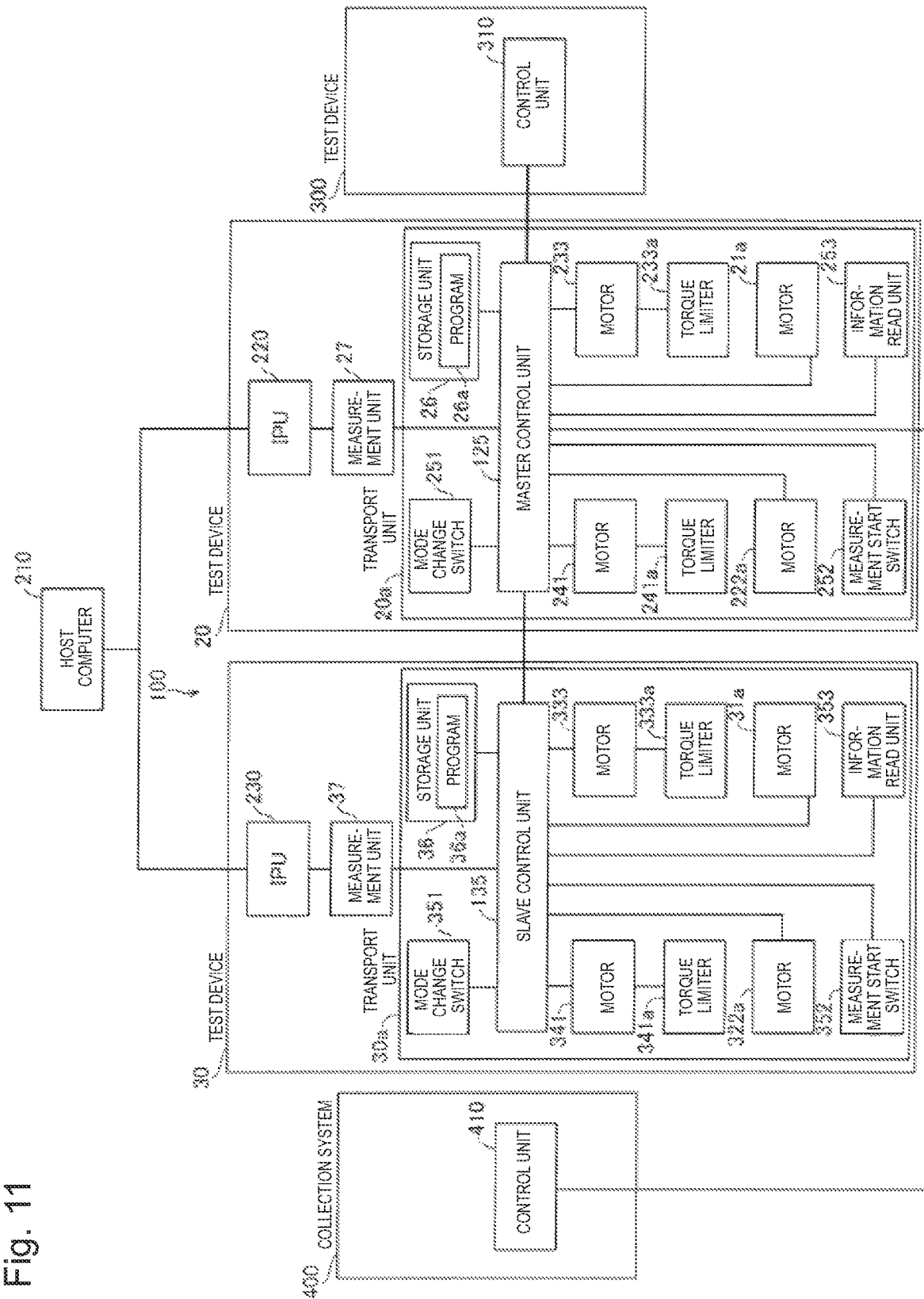
FIG. 11 is a block diagram illustrating the test system according to the second embodiment.

As illustrated in FIG. 10 and FIG. 11, test system 100 is communicably connected to test device 300 and to collection system 400, respectively.

Master control unit 125 is communicably connected to slave control unit 135 of test device 30. Master control unit 125 is communicably connected to control unit 410 of collection system 400. Master control unit 125 acquires information, which indicates whether or not collection holder 420 (see FIG. 10) of collection system 400 is in a full load condition, from control unit 410 of collection system 400.

In the second embodiment, test system 100 can transport rack 500 (see FIG. 2), which is retained in first holder 221 of test device 20, to collection system 400 via first bypass transport unit 21 and second bypass transport unit 31. Test system 100 can transport rack 500, which is retained in first holder 321 of test device 30, to collection system 400 via second bypass transport unit 31.

Figure 12:
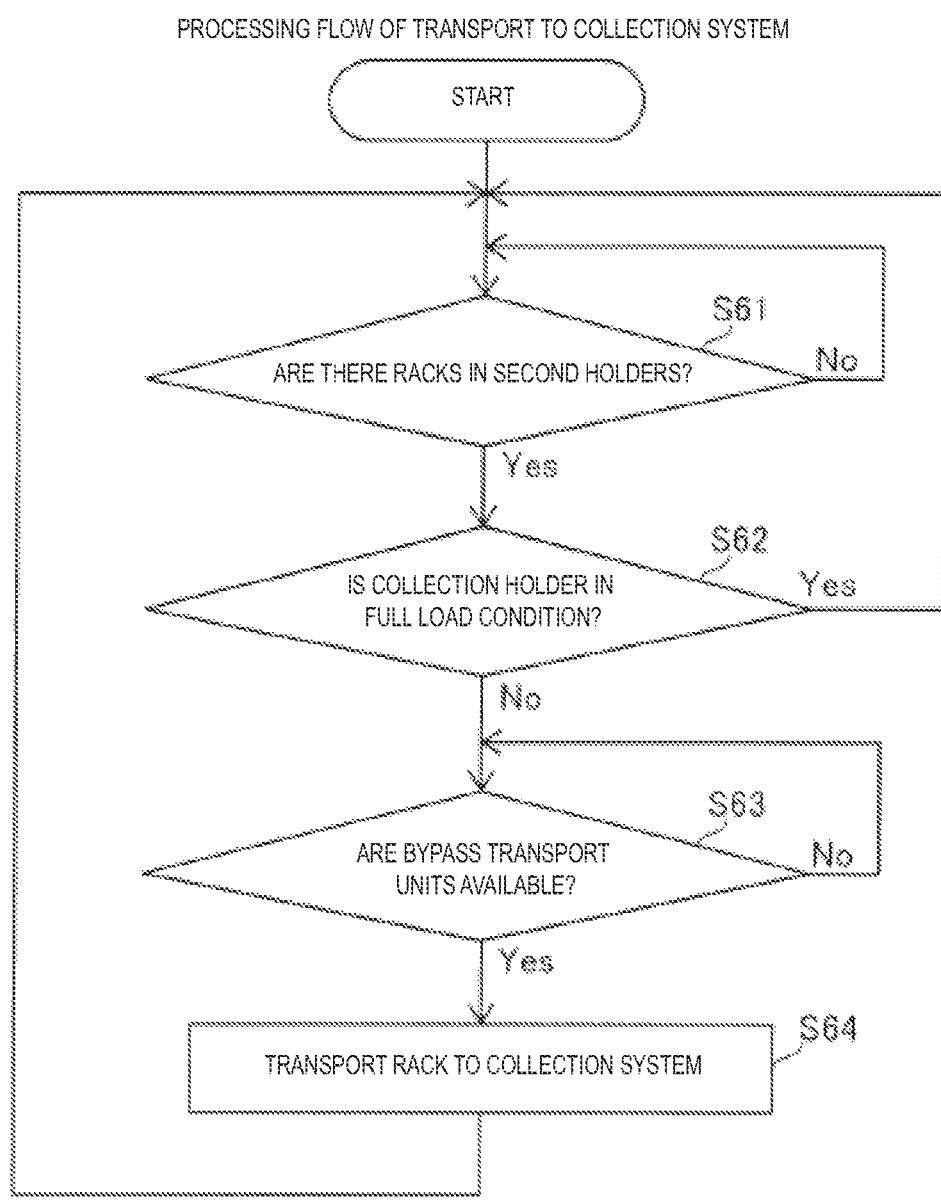
FIG. 12 is a flowchart for explaining processing of transport to a collection system by the test system according to the second embodiment.

Next, transport processing to transport racks 500 from test device 20 and test device 30 to the collection system is described with reference to FIG. 2 and FIG. 12. This processing is conducted by master control unit 125.

In step S61, master control unit 125 determines whether or not there are any racks 500 in the second holders. Specifically, master control unit 125 determines whether or not rack 500 remains in any of second holder 223 of test device 20 and second holder 323 of test device 30. The determination as to whether or not rack 500 remains therein is performed by detecting the presence of the rack in second holder 223 with a not-illustrated sensor.

Master control unit 125 repeats the determination in step S61 until rack 500 is retained in any of second holder 223 of test device 20 and second holder 323 of test device 30. When rack 500 is retained in any of second holder 223 of test device 20 and second holder 323 of test device 30, master control unit 125 moves the processing to step S62.

In step S62, master control unit 125 determines whether or not collection holder 420 (see FIG. 10) of collection system 400 is in the full load condition. Master control unit 125 moves the processing to step S63 when collection holder 420 of collection system 400 is not in the full load condition.

On the other hand, master control unit 125 puts the processing back to step S61 when collection holder 420 of collection system 400 is in the full load condition. Meanwhile, when master control unit 125 determines that both of second holder 223 of test device 20 and second holder 323 of test device 30 are in the full load condition, master control unit 125 does not transmit a delivery request to test device 300. As a consequence, the transport of next rack 500 from test device 300 is interrupted temporarily.

In step S63, master control unit 125 determines whether or not the bypass transport units are available. Specifically, master control unit 125 determines whether or not it is in the course of performing processing to transport rack 500, which contains samples yet to be measured, to any of first holder 221 of test device 20 and first holder 321 of test device 30. If first bypass transport unit 21 or second bypass transport unit 31 is being used for transporting rack 500, which contains the samples yet to be measured, to any of the test devices, then master control unit 125 repeats this determination until master control unit 125 determines that the bypass transport units are available. Master control unit 125 moves the processing to step S64 when master control unit 125 determines that the bypass transport units are available.

In step S64, master control unit 125 transports rack 500 to collection system 400. Specifically, when rack 500 is retained in second holder 223 of test device 20, master control unit 125 moves stopper member 223a downward, moves stop member 21b to such a position where stop member 21b does not interfere with first bypass transport unit 21, and drives first bypass transport unit 21. Furthermore, master control unit 125 sends slave control unit 135 an instruction to allow passage of rack 500. Upon receipt of the instruction, slave control unit 135 locates first movable member 31 at the origin position L1, moves stop member 31b to a non-interference position, and drive second bypass transport unit 31. In this state, master control unit 125 moves second movable member 24 in the Y1 direction. Rack 500 is transported from second holder 223 to collection system 400 via first bypass transport unit 21 and second bypass transport unit 31.

When rack 500 is retained in second holder 323 of test device 30, master control unit 125 sends slave control unit 135 an instruction to transport rack 500 to collection system 400. Upon receipt of the instruction, slave control unit 135 moves stopper member 323a downward, moves stop member 31b to such a position where stop member 31b does not interfere with second bypass transport unit 31, and drives second bypass transport unit 31. In this state, slave control unit 135 moves second movable member 34 in the Y1 direction. Thus, rack 500 is transported from second holder 323 of test device 30 to collection system 400.

Thereafter, master control unit 125 puts the processing back to step S61.

According to the second embodiment, it is possible to simplify test system 100 as with the first embodiment. Moreover, racks 500 can be automatically collected by collection system 400.

Third Embodiment

Figure 13:
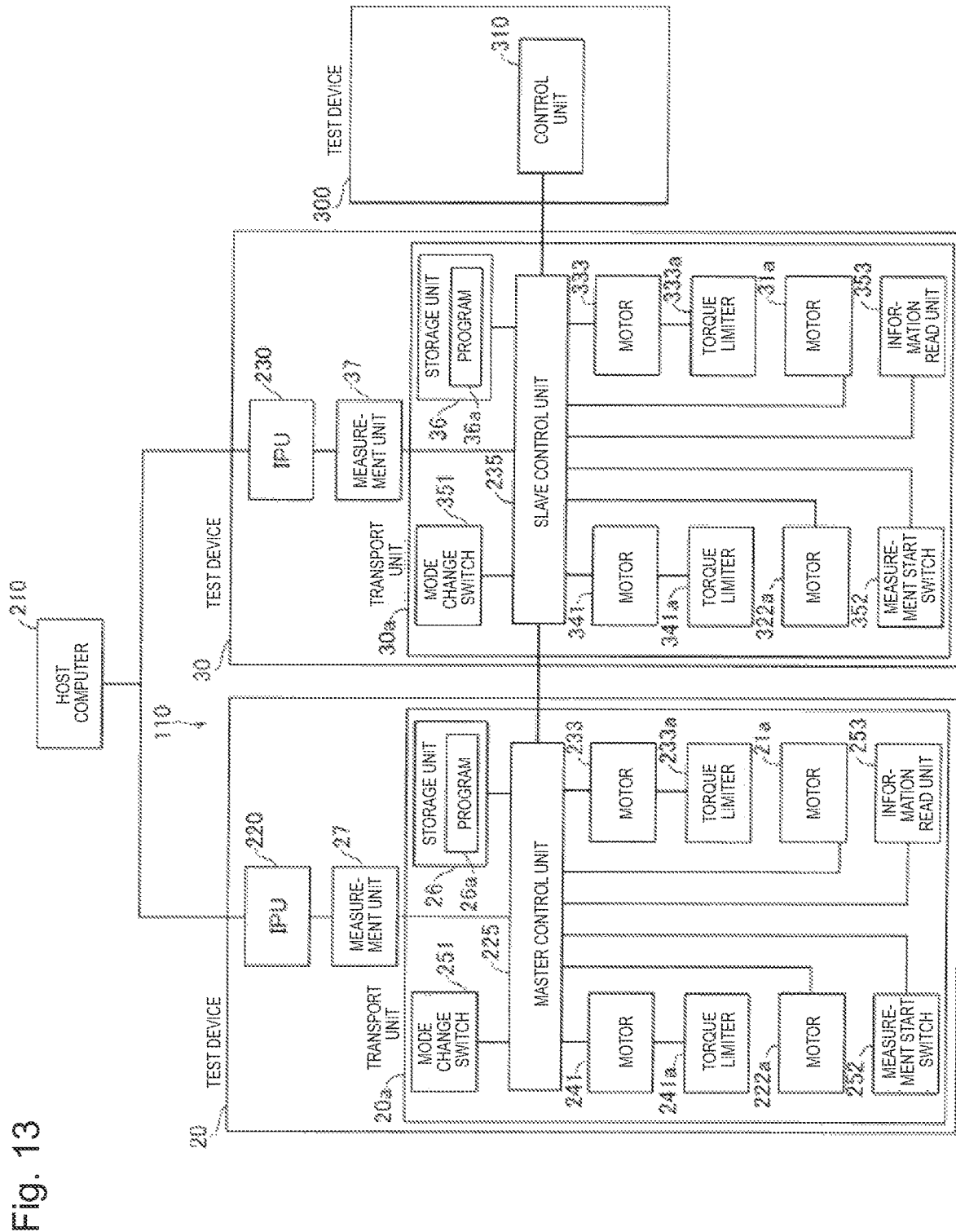
FIG. 13 is a block diagram illustrating a test system according to a third embodiment.

A configuration of test system 110 according to a third embodiment is described below with reference to FIG. 13.

This third embodiment is the same as the first embodiment, except that the test device that includes the master control unit and the test device that includes the slave control unit switch places with each other. The same components as those in the above-described first embodiment are denoted by the same reference numerals and descriptions thereof are omitted.

Master control unit 225 of test device 20 on a downstream side performs the assignment of samples to test device 20 on the downstream side and test device 30 on an upstream side as well as the control of the operations to transport the sample assigned to test device 20 in accordance with the same methods as those of the first and second embodiments. Meanwhile, slave control unit 235 of test device 30 on the upstream side controls the operation to transport the sample assigned to test device 30 by master control unit 225 on the downstream side. Master control unit 225 can communicate with control unit 310 of test device 300 through the intermediary of slave control unit 235. In other words, master control unit 225 can receive the acceptance request (S1 in FIG. 4) from control unit 310 through the intermediary of slave control unit 235, and transmit the delivery request (S5 and S11 in FIG. 4) to control unit 310 through the intermediary of slave control unit 235. As clear from third embodiment as well, any one of the control units of two or more test devices may be caused to function as the master control unit. This configuration can also exert the functions similar to those of the first and second embodiments.

Fourth Embodiment

Figure 14:
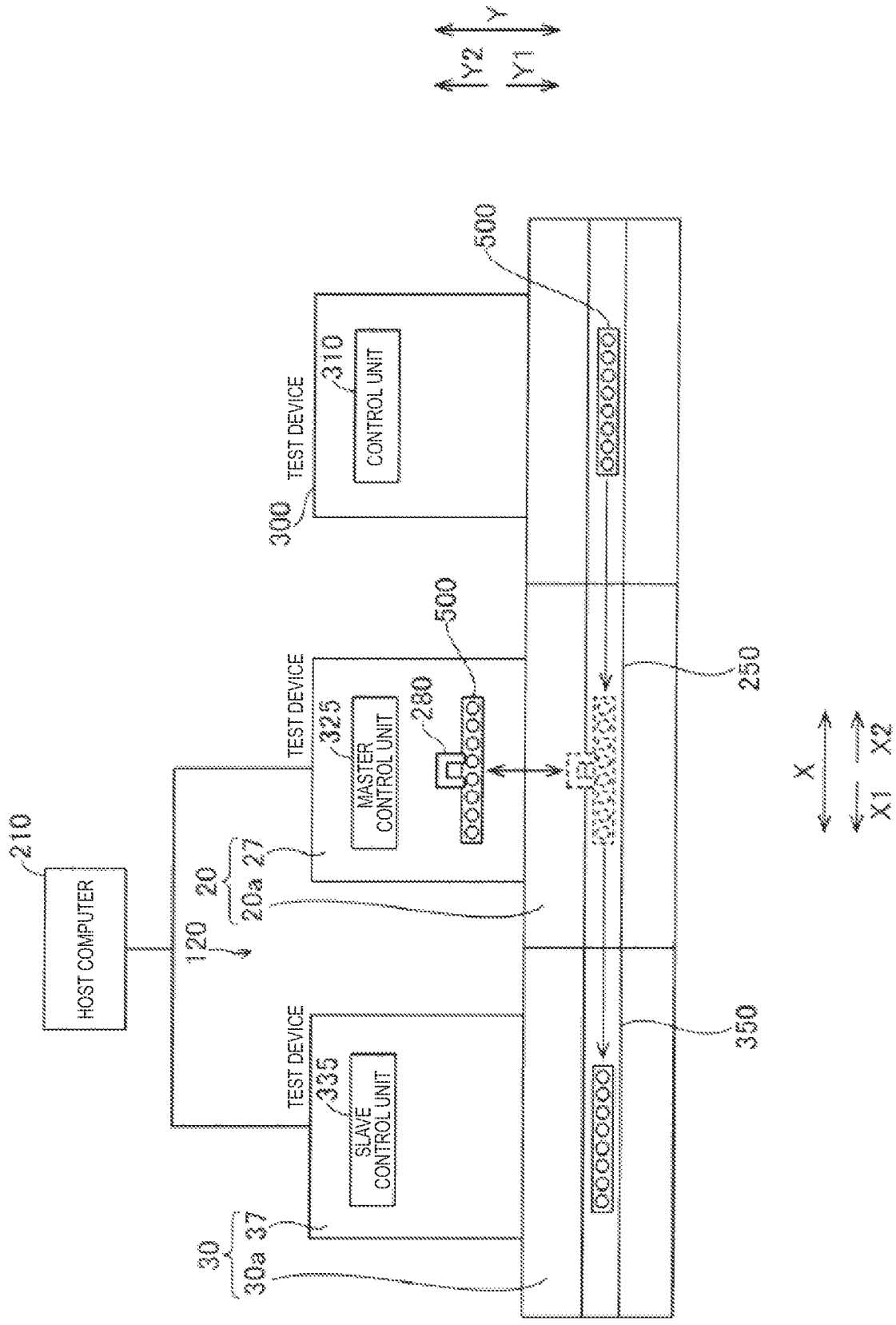
FIG. 14 is a diagram illustrating a state where a test system according to a fourth embodiment is connected to another device.

A configuration of test system 120 according to a fourth embodiment is described below with reference to FIG. 14. In the fourth embodiment, configurations of test device 20 and test device 30 are different from those of the first and second embodiments.

Test device 20 includes one transport path 250. Test device 30 includes one transport path 350. Transport path 250 and transport path 350 are connected in series. Test device 20 grips rack 500 transported onto transport path 250 by using gripper 280 and takes rack 500 out of transport path 250, then moves rack 500 in the Y2 direction, and stows rack 500 into measurement unit 27. Test device 20 aspirates the samples out of the respective sample containers in stowed rack 500. Test device 30 also has the same configuration. Test device 20 can transport rack 500 to test device 30 located downstream via transport path 250 while test device 20 is taking rack 500 out by using gripper 280.

By providing test device 20 and test device 30 with master control unit 325 and slave control unit 335, respectively, this configuration can exert the same functions as those of the first and second embodiments.

According to the fourth embodiment, it is possible to simplify test system 120 as with the first embodiment.

Fifth Embodiment

A configuration of test system 130 according to a fifth embodiment is described below with reference to FIG. 15 to FIG. 19. The fifth embodiment describes a case in which test system 130 is configured as test lines each including multiple test devices of multiple kinds with different test types.

Figure 15:
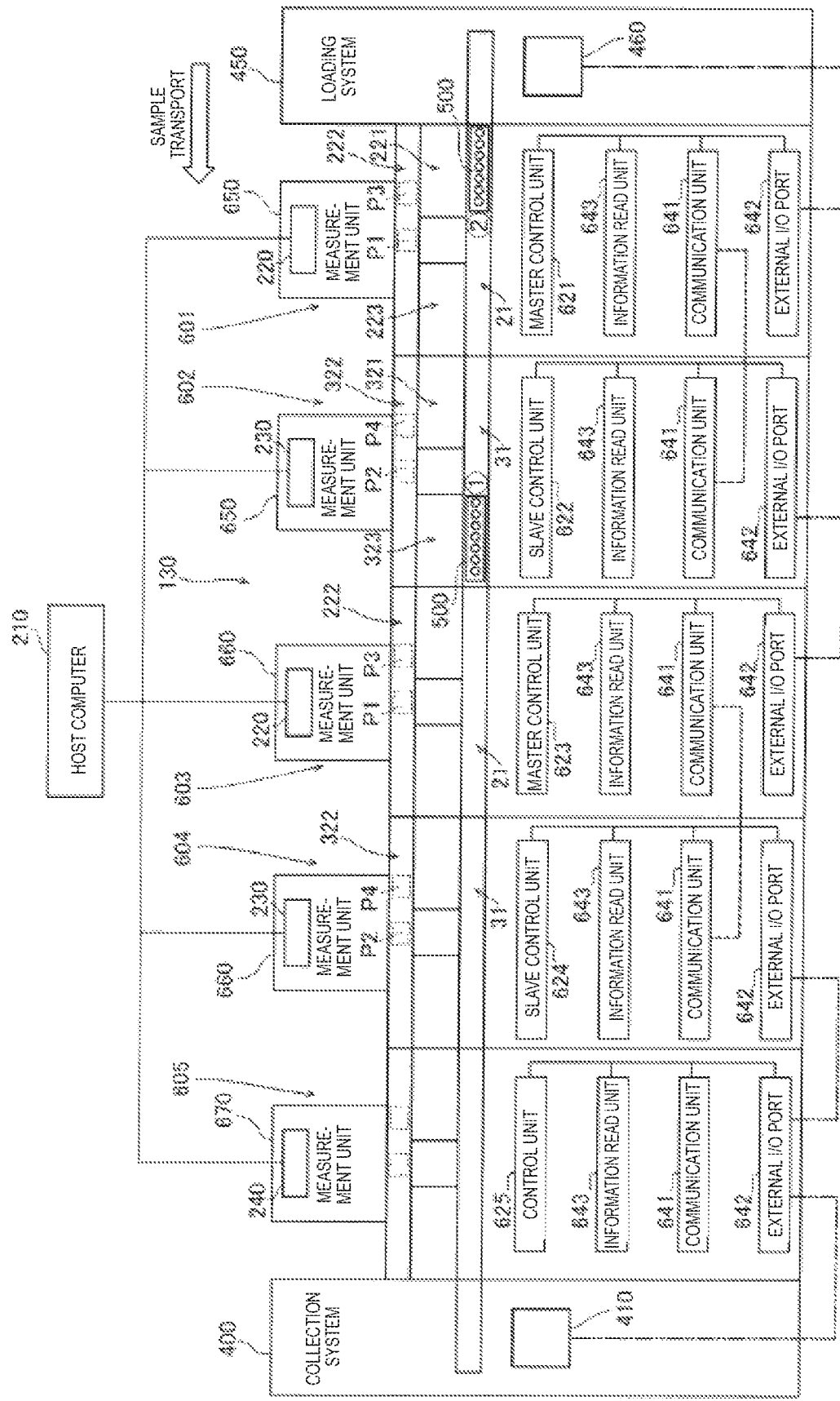
FIG. 15 is a diagram illustrating a configuration example of a test system according to a fifth embodiment.

As illustrated in FIG. 15, test system 130 of the fifth embodiment includes test device 601, test device 602, test device 603, and test device 604 each configured to transport and test samples. Test device 601 and test device 602 are devices, which perform tests of a first test type. Test device 603 and test device 604 are devices, which perform tests of a second test type different from the first test type.

It is possible to provide three or more test devices, which perform tests of the first test type, and to provide three or more test devices, which perform tests of the second test type, respectively. FIG. 15 illustrates a configuration example in which two test devices of the first test type and two test devices of the second test type are provided, respectively.

Test device 601 includes master control unit 621, which performs assignment of samples to test device 601 and test device 602, and control of a transport operation of the sample assigned to test device 601. Test device 602 includes slave control unit 622, which controls a transport operation of the sample assigned to test device 602 by master control unit 621.

Test device 603 includes master control unit 623, which performs assignment of samples to test device 603 and test device 604, and control of a transport operation of the sample assigned to test device 603. Test device 604 includes slave control unit 624, which controls a transport operation of the sample assigned to test device 604 by master control unit 623.

Master control unit 621 of test device 601 assigns the samples to test device 601 and test device 602, which perform the tests of the same first test type. Master control unit 621 does not assign any samples to test devices, which perform tests of a different test type. Master control unit 623 of test device 603 assigns the samples to test device 603 and test device 604, which perform the tests of the same second test type. Master control unit 623 does not assign any samples to test devices, which perform tests of a different test type.

As described above, each of master control unit 621 an master control unit 623 performs the assignment of the samples only to the test devices, which perform the tests of the common test type. In the case of providing three or more test devices, which perform the tests of the common test type, the control unit of any one of such test devices may be configured as the master control unit while the control units of the rest of the test devices may be configured as the slave control units.

By adopting the above-described configuration, even when the test devices of the multiple kinds with different test types are provided, master control unit 621 of test device 601 and master control unit 623 of test device 603 can perform the assignment of the samples to test device 602 and test device 604, which perform the tests of the same types, respectively. As a result, the structure of test system 130 can be simplified.

Note that test devices of different test types involve different time periods required for sample processing, different numbers of samples treated as test objects, and so forth. Accordingly, if a single master control unit performs the assignment to all the test devices in test system 130, the control for performing the assignment is complicated. On the other hand, by adopting the above-described configuration, each of master control unit 621 and master control unit 623 only needs to perform the assignment of the samples to the test devices of the same test type. Thus, the control of the assignment processing can be simplified.

As with the above-described first embodiment, each of the test devices is a device configured to test urine samples. The test types in testing urine samples include a urine qualitative test and a urinary sediment test. The urine qualitative test is a test to measure chemical components in urine, which are related to a clinical test. The urinary sediment test is a test to measure particles (sediments) in urine and to count and classify the particles. Meanwhile, in a test of a urine sample, there may be a case in which a microscopic image of cells in urine is captured and then subjected to microscopic examination to be checked by a doctor and others. Here, capture of a cell image for the microscopic examination is also included as another test type. The test types to be conducted by the test devices may be arbitrarily changed in accordance with the intended use of the test system.

In the configuration example of FIG. 15, the first test type is the urine qualitative test. In this case, test device 601 and test device 602, which perform the tests of the first test type are each a test device configured to perform measurement of a urine sample by detecting colors on a test strip to which the urine sample is applied. Meanwhile, the second test type is the urinary sediment test, for example. In this case, test device 603 and test device 604, which perform the tests of the second test type are each a test device configured to perform measurement of particles in a urine sample by flow cytometry.

Thus, it is possible to obtain test system 130 capable of performing the urine qualitative test, which is definitely conducted in the urine test, by use of test device 601 and test device 602, and performing the urinary sediment test, which is conducted depending on a result of the qualitative test, by use of test device 603 and test device 604. In this case as well, the assignment of the samples to the test devices can be performed on the basis of the test type. Accordingly, it is possible to suppress complication of the configuration of test system 130.

Test system 130 may also include a test device of a third test type. The third test type is the capture of a cell image in a urine sample, for example. Specifically, test system 130 may further include test device 605, which is configured to receive a sample tested by test device 603 or test device 604, and to capture a cell image in the urine sample. Thus, it is possible to obtain versatile test system. 130, which can capture the image used for the microscopic examination in addition to the urine qualitative test as well as the urinary sediment test while suppressing complication of its configuration.

FIG. 15 illustrates an example of test system 130 provided with the five test devices. Test system 130 may include two or more test devices of the third test type. In this case, it is also possible to provide test device 605 with a master control unit and to cause the master control unit to perform assignment of the samples.

Test device 605 includes control unit 625. Meanwhile, each of test device 601, test device 602, test device 603, test device 604, and test device 605 includes communication unit 641, external input-output port 642 (which is indicated as "external I/O port" in FIG. 15), and information read unit 643. Other configurations of each test device are similar to those in the first embodiment. Specifically, except for configurations of measurement units, test device 601 and test device 603 each provided with the master control unit have the same configuration as that of test device 20 illustrated in FIG. 2 and FIG. 3, while test device 602 and test device 604 each provided with the slave control unit have the same configuration as that of test device 30 illustrated in FIG. 2 and FIG. 3. The configurations of the measurement units are to be described later.

The test devices are arranged in series so as to enable delivery of racks 500. Racks 500, which hold samples are transported in order from an upstream side (test device 601 side) to a downstream side (test device 605 side). Like the configuration example of FIG. 15, test system 130 may be provided with collection system 400 disposed at the lowermost stream and loading system 450 disposed at the uppermost stream. Collection system 400 is the same as that in the above-described second embodiment. Loading system 450 can install multiple racks 500 holding samples and supply racks 500 to the test devices on the downstream side.

There is no particular limitation to a positional relation of the test devices in test system 130. For example, it is possible to adopt a configuration in which test device 601 and test device 603 each provided with the master control unit receive the samples earlier than test device 602 and test device 604 each provided with the slave control unit. In other words, test device 601 and test device 603 are disposed upstream of test device 602 and test device 604, respectively, and are configured to receive the samples transported from the upstream side. Hence, rack 500 transported from the upstream side is first delivered to test device 601 or test device 603 provided with the master control unit. Accordingly, it is not necessary to monitor whether or not rack 500 is delivered from outside to test device 602 or test device 604. As a consequence, it is possible to simplify the assignment processing of the samples between the master control units and the slave control units.

In the configuration example of FIG. 15, test device 602 is disposed adjacent to the upstream side of test device 603. In this case, test device 603 receives rack 500 holding the samples from test device 602 on the upstream side. When an acceptance request for a sample is received from test device 602, master control unit 623 acquires a status from slave control unit 624 of test device 604 and determines a test device, which can accept rack 500 holding the samples. Thus, test device 603 or test device 604 can perform a test of the second test type promptly after test device 601 or test device 602 conducts a test of the first test type.

The assignment processing (see FIG. 4) and the acceptance processing (see FIG. 5 and FIG. 6) of the samples between test device 601 and test device 602 are similar to those in the above-described first embodiment. Specifically, master control unit 621 of test device 601 acquires the number of racks 500 stored in test device 602 (step S7 of FIG. 4) from slave control unit 622 of test device 602, and determines whether or not rack 500 is acceptable (step S8 of FIG. 4) based on the number of racks 500.

The same applies to the assignment processing and the acceptance processing of the samples between test device 603 and test device 604. Master control unit 623 of test device 603 acquires the number of racks 500 stored in test device 604 from slave control unit 624 of test device 604, and determines whether or not rack 500 is acceptable based on the number of racks 500. Thus, even if any of the test devices is filled with racks 500, the test processing can be continued by assigning rack 500 to another test device without stopping test system 130.

The transport of the samples between a test device on the upstream side and a test device on the downstream side can be performed by means of exchange of signals between adjacent test devices.

For example, master control unit 623 determines whether or not test device 603 and test device 604 can accept rack 500, and constantly notifies test device 602, which is located adjacent on the upstream side, of the acceptability of rack 500. When the acceptance request for a sample is received from slave control unit 622 of test device 602, master control unit 623 accepts rack 500 and determines a test device out of test device 603 and test device 604, which can accept the samples. In this case, it is not necessary to cause master control unit 621 and master control unit 623 to communicate with each other, and the sample delivery processing can thus be simplified.

Regarding the connection to establish communications among the test device, it is possible to adopt a connection method common to all the test devices or to adopt multiple different communication methods. For example, a communication method between master control unit 621 and slave control unit 622 or between master control unit 623 and slave control unit 624, where the assignment processing takes place, may be different from a communication between master control unit 623 and slave control unit 622 where the assignment processing does not take place. In other words, the communication method between the test devices having the test type in common may be different from the communication method between the test devices having the different test types.

In the configuration example of FIG. 15, test device 601 is network-connected to test device 602 through communication units 641. Likewise, test device 603 is network-connected to test device 604 through communication units 641. Test device 602 and test device 603, whose test types are different, are configured to be connectable through external input-output ports 642, which transmit a smaller amount of information than that by means of the network connection. Communication units 641 perform the network communication based on the TCP/IP protocol in compliance with the Ethernet (registered trademark) standard, for example. External input-output ports 642 are connected to each other through a signal line, and perform signal transmission by switching on (or a high level) and off (or a low level).

In this way, the test devices with the test type in common can ensure a sufficient amount of information transmission for the sample assignment processing and the transport control by means of the network connection between communication units 641. Between the test devices with the different test types, the sample delivery processing can be achieved with a minimum required amount of information transmission by exchanging on-off signals between external input-output ports 642, for example. As a result, it is possible to simplify the configuration of test system 130. Meanwhile, the sample delivery processing can be achieved with the minimum required communication through external input-output ports 642 in the case of providing test devices manufactured by different manufacturers depending on the test types. Thus, compatibility in test system 130 is easily ensured. In the configuration example of FIG. 15, the connection between loading system 450 and test device 601 as well as between collection system 400 and test device 605 is also established through external input-output ports 642. However, illustration of the external input-output ports of collection system 400 and loading system 450 is omitted.

When each of master control unit 621 and master control unit 623 performs the assignment of the samples between the test devices of the same test type, each sample to be assigned only needs to be uniquely identifiable within a group of the test devices of the same test type. In other words, master control unit 621 only needs to be able to uniquely identify each sample or rack 500 within the group composed of test device 601 and test device 602, while master control unit 623 only needs to be able to uniquely identify each sample or rack 500 within the group composed of test device 603 and test device 604. For this reason, while the identification of each sample for achieving the sample assignment may use the sample information to be read by information read unit 643, the sample may instead be provided with an identification number, which is valid only in the group of the test devices of the same test type.

For example, each of master control unit 621 and master control unit 623 is configured to provide rack 500 holding samples with an identification number upon receipt of the samples from the upstream side, and to assign the samples based on the identification number. Thus, it is possible to identify rack 500 by using the identification number and to assign the samples within the group of the test devices of the same test type, without acquiring the sample information in advance. For this reason, it is not necessary to read the sample information on all the samples as the test objects in advance. As a consequence, the configuration of test system 130 can be further simplified.

The identification numbers may adopt consecutive numbers starting from 1, for example. An upper limit of the identification numbers may be defined equal to a maximum number of racks 500, which can exist in the group of the test devices of the same test type. For example, as illustrated in FIG. 15, there are assumed to be test device 601 and test device 602 as the group of the first test type, and each device is assumed to be capable of locating seven racks 500 in first holder 221 (321), seven racks 500 in second holder 223 (323), and two racks 500 on measurement line 222 (322), respectively. In this case, thirty-two racks 500 calculated by 16×2 may exist at the maximum in the group. Accordingly, it is only necessary to provide thirty-two identification numbers from 1 to 32. When rack 500 having a certain identification number is transported out of test device 602 to the downstream side, the certain identification number becomes a dead number, which is assigned to rack 500 to be transported into the group next. FIG. 15 illustrates an example in which an identification number of 1 (see a circled number) is set to rack 500 located ahead in test device 602 and an identification number of 2 is set to rack 500 located behind.

When the identification numbers are used, the sample information attached to the samples can be used solely for the sample measurement in each test device. Master control unit 621 of test device 601 transports rack 500 to measurement line 222 (322) of either test device 601 or test device 602, while master control unit 623 of test device 603 transports rack 500 to measurement line 222 (322) of either test device 603 or test device 604. Thus, each test device can read the sample information attached to the samples sent to measurement line 222 (322) by using information read unit 643, and conduct the tests of the samples based on the read sample information. As a consequence, unlike the case of reading all the sample information prior to the assignment of the samples, the processing efficiency of test system 130 is not deteriorated by spending time for the read processing. Hence, the tests of the samples can be promptly conducted.

Figure 8:
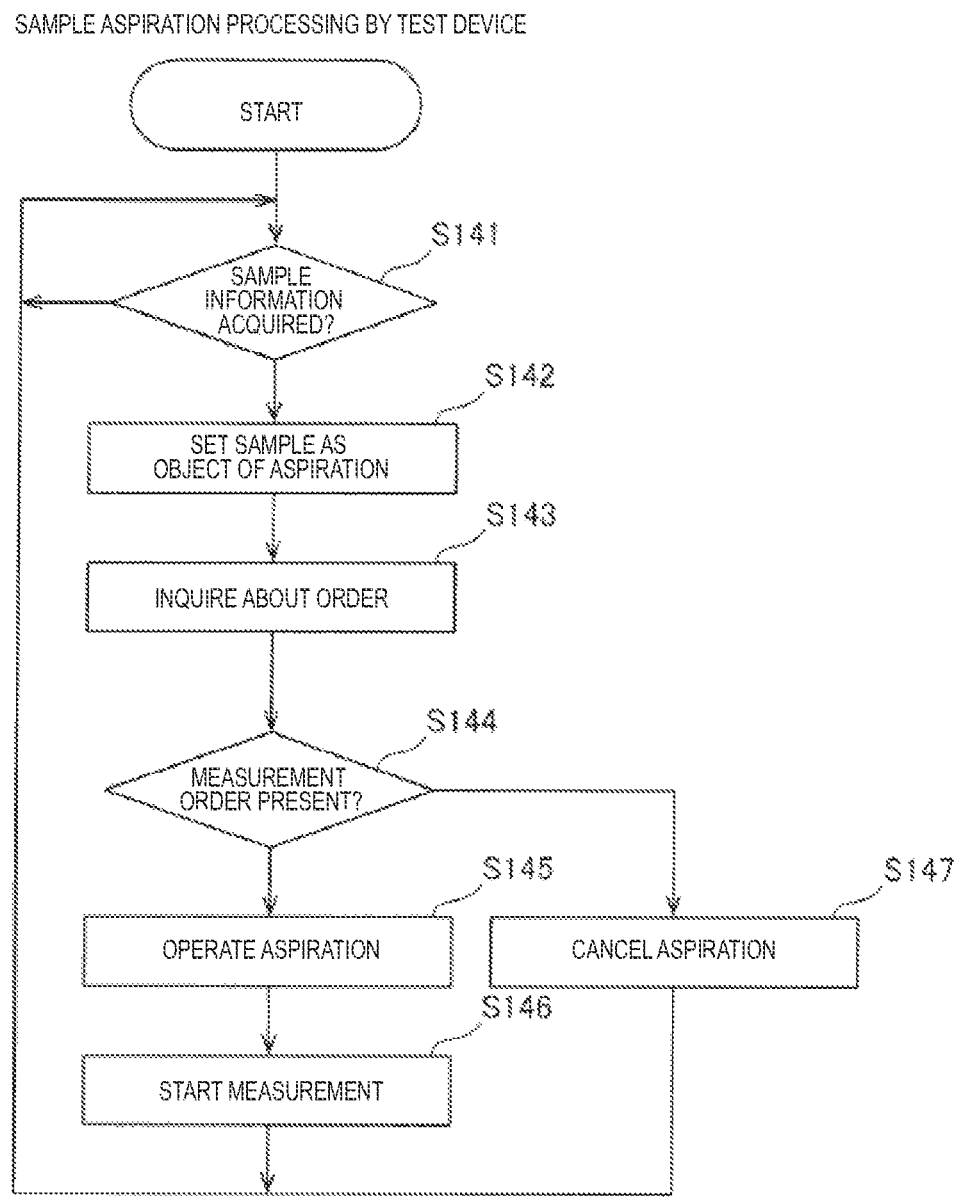
FIG. 8 is a flowchart for explaining sample aspiration processing by the test device.

The processing to read the sample information and to conduct the tests by each test device is similar to the flow illustrated in FIG. 8. Specifically, each control unit out of master control unit 621, master control unit 623, slave control unit 622, and slave control unit 624 determines whether or not to conduct the test of the sample based on the sample information read by information read unit 643 from the sample held in rack 500 transported to measurement line 222 (322). Based on the read information, each control unit determines whether or not there is the measurement order in host computer 210, and performs aspiration of the sample when there is the measurement order. Thus, each test device at a destination of the assignment can determine whether or not to conduct the test of each sample based on the sample information without providing the loading system 450 with a dedicated reading device for reading the sample information in advance, for example. As a consequence, the configuration of test system 130 can be further simplified.

Here, host computer 210 may be a management server, which manages test information on the entire facility in which test system 130 is installed, or a management computer for managing test system 130. When host computer 210 is the management computer, host computer 210 is network-connected to a management server, which manages the test information on the entire facility, and mediates the exchange of inquiries about the measurement orders and delivery of the measurement orders between the management server and test system 130.

Configuration Examples of Measurement Units

Next, configurations of the measurement units in the respective test devices of the first test type to the third test type are described with reference to FIG. 15 to FIG. 18.

Figure 16:
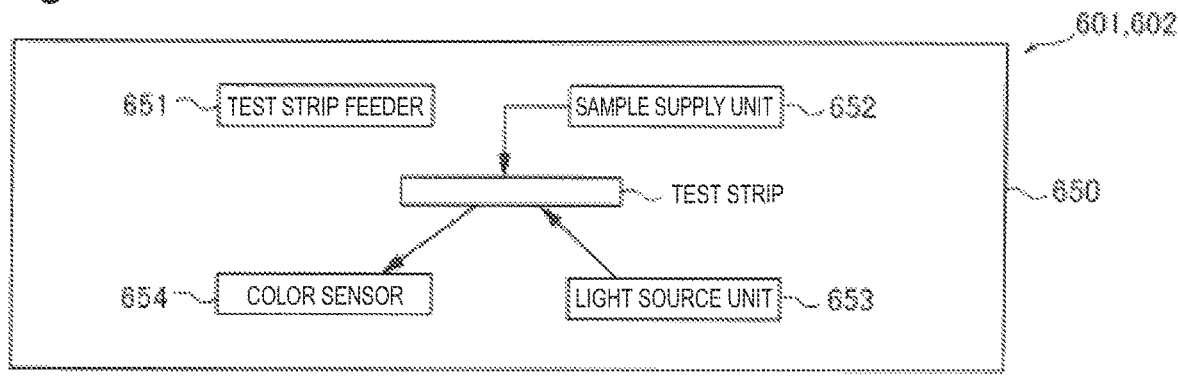
FIG. 16 is a block diagram for explaining a measurement unit of a test device, which performs a urine qualitative test.

Each of test device 601 and test device 602 of the first test type (see FIG. 15) includes measurement unit 650 for detecting colors on a test strip. As illustrated in FIG. 16, measurement unit 650 applies a urine sample to a test strip and measures color reactions on the test strip, thereby measuring test item elements contained in the urine. Measurement unit 650 sends the test strip from test strip feeder 651 storing the test strips out to a predetermined test position. Sample supply unit 652 supplies the urine sample, which is aspirated from the sample container either at the first loading position P1 or at the second loading position P2, to the test strip. Measurement unit 650 irradiates the test strip with measurement light from light source unit 653 and receives the measurement light with color sensor 654, thereby measuring the color reactions on the test strip. The measurement items include, for example, glucose, protein, bilirubin, ph (hydrogen ion exponent), and the like.

Figure 17:
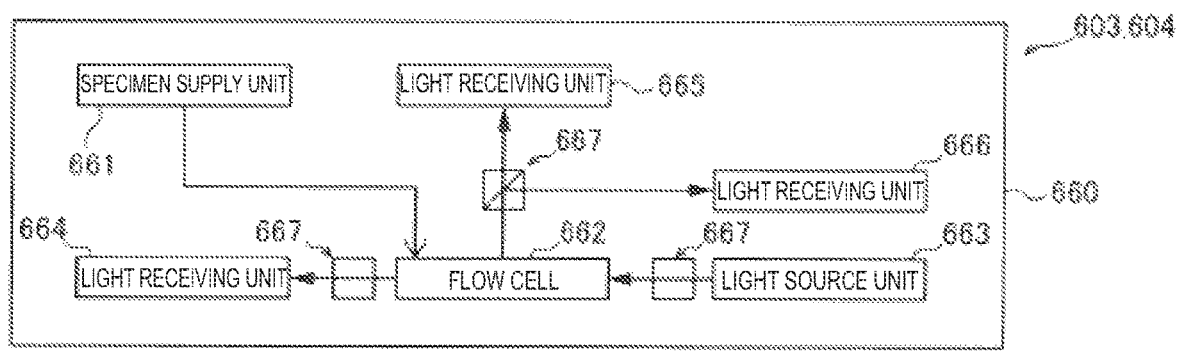
FIG. 17 is a block diagram for explaining a measurement unit of a test device, which performs a urinary sediment test.

Each of test device 603 and test device 604 of the second test type (see FIG. 15) includes measurement unit 660 provided with a flow cytometer. As illustrated in FIG. 17, in measurement unit 660, a measurement specimen is prepared from the urine sample, which is aspirated from the sample container either at the first loading position P1 or at the second loading position P2, by using a reagent such as a staining solution. Then, specimen supply unit 661 supplies the measurement specimen to flow cell 662. Light source unit 663 irradiates flow cell 662 with measurement light. Light receiving unit 664, light receiving unit 665, and light receiving unit 666 measure forward scattered light, side scattered light, and fluorescence, respectively, which originate from particles in the measurement specimen flowing in flow cell 662. Optical system 667 including a lens, a spectroscopic element, and the like is provided in each space between flow cell 662 and each of light source unit 663, light receiving unit 664, light receiving unit 665, and light receiving unit 666. IPU 220 or 230 (see FIG. 15) of measurement unit 660 counts and classifies the particles by analyzing light reception signals thus obtained. The particles include, for example, red blood cells, white blood cells, epithelial cells, casts, bacteria, and the like contained in the urine sample.

Figure 18:
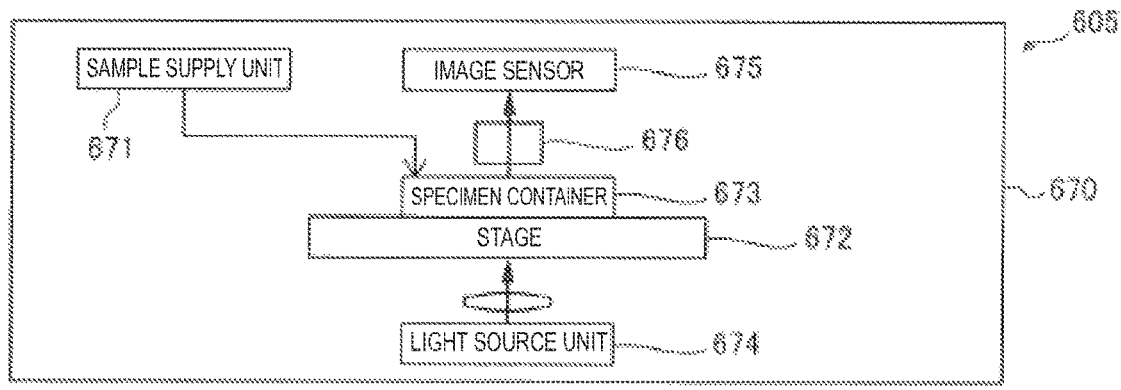
FIG. 18 is a block diagram for explaining a test device, which captures a cell image in a urine sample.

Test device 605 of the third test type (see FIG. 15) includes measurement unit 670 provided with an image capturing unit for capturing a cell image in the urine. As illustrated in FIG. 18, in measurement unit 670, sample supply unit 671 supplies the urine sample aspirated at a loading position to specimen container 673 disposed on movable stage 672. Light source unit 674 irradiates specimen container 673 with illumination light. Image sensor 675 captures a cell image in specimen container 673 through objective lens 676. IPU 240 (see FIG. 15) of measurement unit 670 stores the captured image acquired from image sensor 675.

Signal Transmission Between Test Devices Using External Input-Output Ports

Next, the signal transmission between the test devices using external input-output ports 642 is described with reference to FIG. 19.

Figure 19:
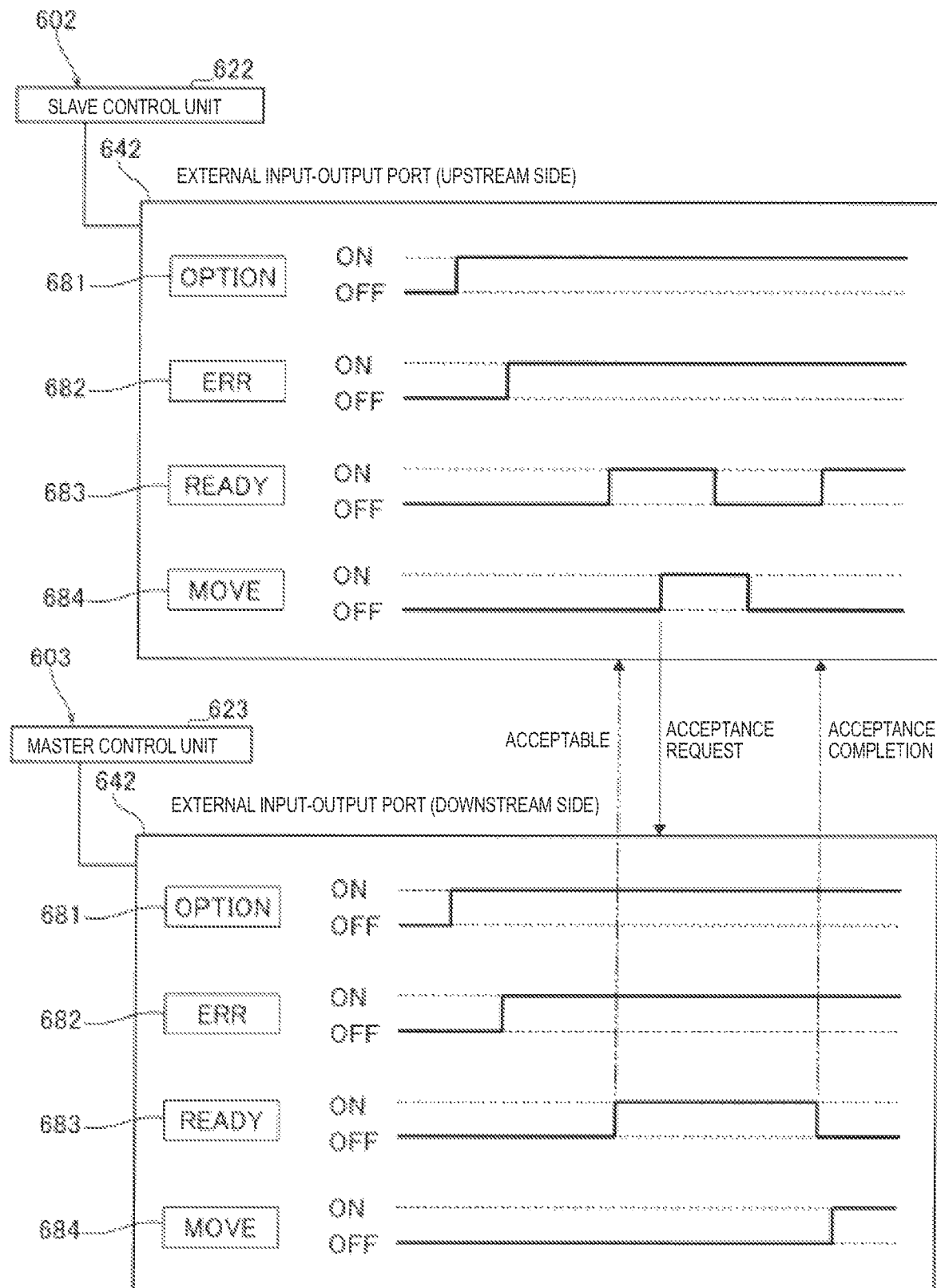
FIG. 19 is a diagram for explaining signal transmission between test devices in the test system according to the fifth embodiment by using external input-output ports.

FIG. 19 illustrates a configuration example in which master control unit 623 of test device 603 and slave control unit 622 of test device 602, which are connected to each other through external input-output ports 642, perform signal transmission concerning transport of a sample by use of four ports. Specifically, each external input-output port 642 includes OPTION port 681, ERR port 682, READY port 683, and MOVE port 684.

OPTION port 681 represents a status of a power source of the test device. For example, an ON level represents that the power source is on while an OFF level represents that the power source is off.

ERR port 682 represents presence of an error in the test device. For example, an ON level represents that an error is not present while an OFF level represents that an error is present.

READY port 683 represents a status whether or not the test device can accept rack 500. For example, an ON level represents a status of being acceptable while an OFF level represents a state of being not acceptable.

MOVE port 684 represents a status of transport of rack 500 in the test device. For example, an ON level represents a status of being in the course of transport while an OFF level represents a state of being not in the course of transport.

Master control unit 623 on the downstream side constantly notifies slave control unit 622 on the upstream side of the status of the power source and the presence of an error by using OPTION port 681 and ERR port 682. The transport of rack 500 is performed when the test device on the downstream side is in the state where the power source is on, an error is not present, and rack 500 is acceptable. In other words, slave control unit 622 on the upstream side performs the transport of rack 500 to the downstream side when OPTION port 681, ERR port 682, and READY port 683 of master control unit 623 on the downstream side are each at the ON level.

When rack 500 is transported to the downstream side, slave control unit 622 on the upstream side raises MOVE port 684 from the OFF level to the ON level, and sends rack 500 out to the downstream side. Master control unit 623 on the downstream side starts acceptance of rack 500 based on the change of MOVE port 684 from the OFF level to the ON level. Accordingly, the raise of MOVE port 684 to the ON level corresponds to the acceptance request made to the device on the downstream side (see step S1 of FIG. 4).

When rack 500 is accepted, master control unit 623 on the downstream side changes READY port 683 to the OFF level. Thus, slave control unit 622 on the upstream side understands that rack 500 is delivered. Accordingly, the change of READY port 683 to the OFF level corresponds to the acceptance completion signal sent to the device on the upstream side (see step S12 of FIG. 4).

Transport Processing of Rack Between Test Devices of Different Test Types

Next, transport processing of rack 500 between the test devices of different test types is described with reference to FIG. 15 and FIG. 20. This processing is the control to be performed between the master control unit on the downstream side and the slave control unit on the upstream side, which are adjacent to each other. Here, the transport between test device 602 and test device 603 in the configuration example of FIG. 15 is described as an example.

In step S71 of FIG. 20, slave control unit 622 of test device 602 on the upstream side determines whether or not to perform the transport of rack 500 out of test device 601 to the downstream side. Specifically, slave control unit 622 conducts the determination through communication units 641 as to whether or not there is an acceptance request for rack 500 from master control unit 621 of the same test type to test device 603 on its downstream side. Meanwhile, if there is no acceptance request, slave control unit 622 on the upstream side determines whether or not rack 500 is to be transported out of test device 602 to test device 603 on the downstream side in step S72. Slave control unit 622 on the upstream side repeats the determinations in steps S71 and S72 until it is determined that rack 500 is to be transported out of test device 601 or test device 602.

When test device 601 or test device 602 transports rack 500 out, slave control unit 622 determines whether or not the downstream side can accept rack 500 in step S73. Specifically, slave control unit 622 determines whether or not OPTION port 681, ERR port 682, and READY port 683 of master control unit 623 on the downstream side are each at the ON level. If any of these three ports is not at the ON level, slave control unit 622 on the upstream side stands by until the relevant port is changed to the ON level.

When the downstream side can accept rack 500, in step S74, slave control unit 622 on the upstream side transmits the acceptance request to master control unit 623 on the downstream side by raising MOVE port 684 to the ON level. Then, in step S75, slave control unit 622 on the upstream side transports rack 500 out of second bypass transport unit 31 (see FIG. 15) to the downstream side. Here, in the case of transport out of test device 601, slave control unit 622 on the upstream side receives rack 500 from first bypass transport unit 21 (see FIG. 15) with second bypass transport unit 31, and then transports rack 500 directly out to the downstream side.

On the other hand, in step S81, master control unit 623 of test device 603 on the downstream side determines whether or not there is the acceptance request from the upstream side, based on whether or not MOVE port 684 of slave control unit 622 on the upstream side is raised to the ON level. When the acceptance request is not present, master control unit 623 on the downstream side stands by until there is the acceptance request.

When there is the acceptance request, in step S82, master control unit 623 on the downstream side sets an identification number to rack 500 to be transported in this time. In step S83, master control unit 623 performs the assignment processing and the acceptance processing of the samples regarding rack 500 to which the identification number is newly set. Each of the assignment processing and the acceptance processing of the samples is similar to the processing illustrated in FIG. 4 to FIG. 6.

After the assignment processing and the acceptance processing of the samples, master control unit 623 transmits the acceptance completion signal to slave control unit 622 on the upstream side in step S84. Specifically, master control unit 623 on the downstream side changes READY port 683 to the OFF level, and brings the processing back to step S81. When rack 500 is acceptable again, master control unit 623 on the downstream side changes READY port 683 to the ON level and waits for transmission of another transmission request from the upstream side.

During the assignment processing and the acceptance processing of the samples on the downstream side, in step S76, slave control unit 622 on the upstream side determines whether or not the acceptance completion signal is received. Slave control unit 622 stands by while repeating the determination of step S76 until the acceptance completion signal is received.

When READY port 683 of master control unit 623 on the downstream side is changed to the OFF level, in step S77, slave control unit 622 on the upstream side determines whether or not the outward transport of rack 500 this time is the processing of transport out of test device 601. In other words, slave control unit 622 determines whether or not the outward transport this time is based on the reception of the acceptance request from test device 601 in step S71.

In the case of the processing of transport out of test device 601, slave control unit 622 on the upstream side reports completion of the outward transport to master control 621 on the upstream side through communication units 641 in step S78, and then brings the processing back to step S71. On the other hand, when the processing of the outward transport this time is based on the determination of transporting rack 500 out of test device 602 made in step S72, slave control unit 622 on the upstream side brings the processing directly back to step S71.

The transport processing of rack 500 between the test devices of different test types according to the fifth embodiment is performed as described above. Here, the transport processing between test device 604 and test device 605 is basically the same. When the test device of the third test type consists of single test device 605 as in FIG. 15, rack 500 may be delivered just on the basis of whether or not test device 605 per se can accept rack 500, without performing the assignment processing of rack 500.

Modified Examples

In the first to fifth embodiments, the transport unit of each test device is provided with the master control unit or the slave control unit. Instead, the IPU may be provided with the functions of the master control unit. In other words, one of the IPUs may function as the master control unit and execute the assignment of samples and the control of the transport unit, while the other IPU may function as the slave control unit and control the transport by the transport unit in accordance with the instruction from the master control unit.

Test system 100 does not have to be the urine test system. In other words, the sample subject to the measurement does not have to be urine, but may be blood, serum, or plasma instead. The embodiments are also applicable, for example, to a blood test system, a coagulation test system, an immunological test system, a biochemical test system, and the like.

Test device 20 and test device 30 may be test devices of different test types. For example, test device 20 may be a urine qualitative test device while test device 30 may be a urine particle test device. Alternatively, test device 20 may be a blood cell counter while test device 30 may be a smear preparing apparatus.

Test system 100 does not have to be provided with test device 300. In this case, for example, the system may be configured to perform the assignment of samples by detecting that a user sets a rack at an end portion in the X2 direction of first bypass transport unit 21 of test device 20. Alternatively, instead of test device 300, test system 100 may include a dedicated loading system having functions to store racks holding samples before being tested, and to transport the racks sequentially to test device 20.

Note that the embodiments disclosed herein are to be considered as mere examples in all aspects and are not restrictive. The scope of the invention is defined not by the above descriptions of the embodiments but is defined by the scope of claims. Furthermore, the invention also encompasses various changes within the significance and scope equivalent to the scope of claims.

The invention claimed is:

1. A test system comprising:
 a first test device comprising a master control unit and a first transport unit, the first transport unit comprising a first motor; and
 a second test device comprising a slave control unit and a second transport unit, the slave control unit communicably coupled with the master control unit, the second transport unit located downstream of the first transport unit in a transport direction of transporting samples, the second transport unit comprising a second motor, wherein
 each of the master control unit and the slave control unit is programmed to selectively operate in a system measurement mode and a stand-alone measurement mode, the system measurement mode accepting samples assigned by the master control unit and the stand-alone measurement mode accepting samples that are manually installed on the first or the second test device by a user,
 the master control unit is configured with program instructions to perform operations comprising:
 determining a first acceptability condition status indicating whether the first test device can accept a sample transported from upstream of the first transport unit and a second acceptability condition status indicating whether the second test device can accept the sample, the first acceptability condition status indicating that the first test device cannot accept the sample for the master control unit operating under the stand-alone measurement mode, and the second acceptability condition status indicating that the second test device cannot accept the sample for the slave control unit operating under the stand-alone measurement mode;

determining, among the first and second test devices, a destination of the sample based upon the first acceptability condition status and the second acceptability condition status;

in response to the first test device being determined as the destination, controlling the first transport unit to dispose the sample at a first loading position of the first test device; and in response to the second test device being determined as the destination, send a request to the slave control unit to receive the sample;

the slave control unit is configured with program instructions to perform operations comprising:

in response to the request from the master control unit, controlling the second transport unit to dispose the sample at a second loading position of the second test device; and the slave control unit is further configured with program instructions to perform operations comprising in response to the stand-alone measurement mode being set for the slave control unit, controlling the second transport unit to dispose a sample installed by a user on the second transport unit at the second loading position.

2. The test system according to claim 1, wherein
the first transport unit of the first test device comprises:
a first supply transport unit; and
a first bypass transport unit,
the second test device comprises a second supply transport unit,
the master control unit is configured with program instructions to perform operations further comprising:
controlling the first supply transport unit to supply the sample to the first loading position to load the sample, and
controlling the first bypass transport unit to transport the sample downstream in the transport direction to the second test device while causing the sample to bypass the first loading position to load the sample, and
the slave control unit is configured with program instructions to perform operations further comprising controlling the second supply transport unit to supply the sample, accepted via the first bypass transport unit, to the second loading position to load the sample.

3. The test system according to claim 2, wherein
the master control unit is configured with program instructions to perform operations such that for assigning a sample to the first test device; the master control unit performs operations to control the first supply transport unit to supply the sample to the first loading position, and
the master control unit is configured with program instructions to perform operations such that for assigning a sample to the second test device the master control unit performs operations to:

control the first bypass transport unit to supply the sample to the second loading position, and
transmit an instruction to the slave control unit so as to cause the slave control unit to perform operations to control the second supply transport unit to supply the sample to the second loading position.

4. The test system according to claim 2, wherein
each of the first supply transport unit and the second supply transport unit further comprises:
a first holder to retain a sample before being tested;
a second holder to retain a tested sample; and
a measurement line that transports the sample in the first holder to the second holder via any of the first loading position and the second loading position.

5. The test system according to claim 4, wherein
the second test device further comprises a second bypass transport unit capable of transporting a sample to a side of the second test device opposite from the first test device while bypassing the second loading position, and
the second holder comprises a stopper member that restricts movement of a sample to any of the first bypass transport unit and the second bypass transport unit.

6. The test system according to claim 1, wherein
the master control unit is configured with program instructions to perform operations further comprising:
communicating with the second test device and monitoring the acceptability condition status of the second test device.

7. The test system according to claim 6, wherein
the master control unit is configured with program instructions to perform operations further comprising monitoring racks retained in each of the first test device and the second test device, the racks holding samples, and
the master control unit is configured with program instructions to perform operations such that the master control unit does not perform the operation of assigning a sample to a test device out of the first test device and the second test device for the test device retaining a predetermined number or more of the racks.

8. The test system according to claim 1, wherein the master control unit is configured with program instructions to perform operations such that assigning samples to a test device out of the first test device and the second test device is performed by alternatively allocating the samples to the first test device and the second test device according to a predetermined cycle.

9. The test system according to claim 1, further comprising:
a third test device comprising a second control unit, wherein
the master control unit is communicable with the second control unit of the third test device,
the master control unit is configured with program instructions to perform operations comprising
receiving a request for accepting a sample from the second control unit of the third test device,
acquiring a status from the slave control unit, and
determining a test device of the first test device and the second test device that is capable of accepting the sample.

10. The test system according to claim 1, wherein each of the first test device and the second test device is operable in a stand-alone measurement mode to test samples independently and in a system measurement mode in which the first test device and the second test device test samples in cooperation with each other.

11. The test system according to claim 10, wherein, for the first test device being set in the stand-alone measurement mode, the master control unit is configured with program instructions to perform operations comprising prohibiting assignment of a sample to the first test device and assigns the sample to the second test device.

12. The test system according to claim 1, wherein, for the first test device being set in a stand-alone measurement mode to test samples independently during a measurement in a system measurement mode in which the first test device and the second test device test samples in cooperation with each other, the master control unit is configured with program instructions to perform operations comprising causing the first test device to continue the measurement of the sample remaining in the first test device and prohibits assignment of another sample to the first test device.

13. The test system according to claim 1, wherein the master control unit and the slave control unit are built in the first test device and the second test device, respectively.

* * * * *